(12) United States Patent
Zhu et al.

(10) Patent No.: US 11,073,983 B2
(45) Date of Patent: Jul. 27, 2021

(54) DISPLAY METHOD AND APPARATUS

(71) Applicant: Huawei Technologies Co., Ltd., Shenzhen (CN)

(72) Inventors: Dengkui Zhu, Beijing (CN); Quanquan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/618,631

(22) PCT Filed: Jun. 13, 2017

(86) PCT No.: PCT/CN2017/088140
§ 371 (c)(1),
(2) Date: Dec. 2, 2019

(87) PCT Pub. No.: WO2018/227398
PCT Pub. Date: Dec. 20, 2018

(65) Prior Publication Data
US 2020/0192564 A1 Jun. 18, 2020

(51) Int. Cl.
*G06F 3/0488* (2013.01)
*G06F 3/01* (2006.01)
*G06F 3/14* (2006.01)

(52) U.S. Cl.
CPC .......... *G06F 3/04883* (2013.01); *G06F 3/017* (2013.01); *G06F 3/1423* (2013.01); *G06F 3/1454* (2013.01)

(58) Field of Classification Search
CPC ................................................ G06F 3/04883
(Continued)

(56) References Cited

U.S. PATENT DOCUMENTS 8,774,536 B1 * 7/2014 Jia ........................... H04L 67/42
382/232
8,843,358 B2 * 9/2014 Newell ..................... G06F 3/14
703/23
(Continued)

FOREIGN PATENT DOCUMENTS

CN      102763342 A    10/2012
CN      104243883 A    12/2014
(Continued)

OTHER PUBLICATIONS

Machine Translation and Abstract of Chinese Publication No. CN104243883, Dec. 24, 2014, 17 pages.
(Continued)

*Primary Examiner* — Daniel Rodriguez
(74) *Attorney, Agent, or Firm* — Conley Rose, P.C.

(57) ABSTRACT

A display method and an apparatus, where the method includes obtaining, by a first terminal, a first gesture made by a user on a target shortcut in a first display interface after the first terminal couple to a second terminal, where the first display interface is an interface presented on the first terminal, and target content corresponding to the target shortcut is not running in a foreground of the first terminal, and sending, by the first terminal, first display data to the second terminal based on the first gesture such that the second terminal displays the first display data in a second display interface, where the first display data is data correlated with the target content, and the second display interface is an interface presented on the second terminal.

20 Claims, 28 Drawing Sheets

(58) Field of Classification Search
USPC .......................................................... 715/863
See application file for complete search history.

(56) References Cited

U.S. PATENT DOCUMENTS

| | | | |
|---|---|---|---|
| 8,914,623 B2 | 12/2014 | Yamazaki et al. | |
| 9,060,006 B2 | 6/2015 | Yusupov et al. | |
| 9,666,167 B2* | 5/2017 | Choi | G09G 5/37 |
| 9,686,323 B1* | 6/2017 | Helter | H04L 65/1066 |
| 9,953,101 B1* | 4/2018 | Walliser | G06F 21/32 |
| 10,327,030 B2* | 6/2019 | Oh | H04N 21/4122 |
| 10,437,547 B2* | 10/2019 | Rydenhag | G06F 9/4856 |
| 2005/0091571 A1 | 4/2005 | Leichtling | |
| 2005/0240983 A1* | 10/2005 | Peters | G06F 9/451 |
| | | | 726/1 |
| 2010/0259464 A1* | 10/2010 | Chang | H04L 63/0853 |
| | | | 345/2.3 |
| 2011/0107320 A1* | 5/2011 | Flisakowski | G06F 16/50 |
| | | | 717/170 |
| 2011/0112819 A1 | 5/2011 | Shirai et al. | |
| 2011/0154249 A1 | 6/2011 | Jang et al. | |
| 2011/0213855 A1* | 9/2011 | King | H04L 67/02 |
| | | | 709/217 |
| 2011/0283334 A1* | 11/2011 | Choi | H04W 4/023 |
| | | | 725/148 |
| 2012/0079095 A1* | 3/2012 | Evans | G06F 9/4451 |
| | | | 709/224 |
| 2012/0278727 A1* | 11/2012 | Ananthakrishnan | |
| | | | H04L 29/08576 |
| | | | 715/748 |
| 2013/0113879 A1 | 5/2013 | Chen | |
| 2013/0318370 A1* | 11/2013 | Gorbatov | G06F 9/5094 |
| | | | 713/300 |
| 2014/0123038 A1* | 5/2014 | Ahn | G06F 3/0486 |
| | | | 715/761 |
| 2014/0136986 A1* | 5/2014 | Martin | G06F 3/0485 |
| | | | 715/748 |
| 2014/0164632 A1* | 6/2014 | Kim | H04L 67/2819 |
| | | | 709/227 |
| 2014/0313103 A1 | 10/2014 | Goel et al. | |
| 2014/0375834 A1* | 12/2014 | Lohan | G06F 9/52 |
| | | | 348/211.99 |
| 2015/0046846 A1* | 2/2015 | Choi | G06F 3/0482 |
| | | | 715/753 |
| 2015/0065056 A1* | 3/2015 | Won | G06F 1/1462 |
| | | | 455/41.3 |
| 2015/0199125 A1* | 7/2015 | Tsukamoto | G06F 3/04817 |
| | | | 715/765 |
| 2015/0200985 A1* | 7/2015 | Feldman | H04L 67/12 |
| | | | 715/753 |
| 2015/0261423 A1* | 9/2015 | Beaumont | G06F 3/04817 |
| | | | 715/778 |
| 2015/0264169 A1* | 9/2015 | Yim | H04M 1/72448 |
| | | | 455/411 |
| 2016/0021119 A1* | 1/2016 | Bender | H04L 63/20 |
| | | | 726/1 |
| 2016/0117141 A1* | 4/2016 | Ro | G06F 3/04817 |
| | | | 715/748 |
| 2016/0210016 A1* | 7/2016 | Shin | G06F 3/0482 |
| 2016/0216852 A1* | 7/2016 | Lee | G06F 3/04842 |
| 2016/0216867 A1* | 7/2016 | Kung | G06F 3/0482 |
| 2016/0249114 A1* | 8/2016 | Ryu | H04N 21/4126 |
| 2016/0343350 A1* | 11/2016 | Khoury | G06F 3/0481 |
| 2017/0272681 A1* | 9/2017 | Oh | H04N 21/443 |
| 2019/0138172 A1* | 5/2019 | Kim | H04L 67/125 |
| 2019/0303088 A1* | 10/2019 | Yuan | G06F 3/0482 |

FOREIGN PATENT DOCUMENTS

| | | |
|---|---|---|
| CN | 105516754 A | 4/2016 |
| CN | 105959748 A | 9/2016 |
| CN | 106095237 A | 11/2016 |
| CN | 106453538 A | 2/2017 |
| EP | 2242240 A1 | 10/2010 |

OTHER PUBLICATIONS

Machine Translation and Abstract of Chinese Publication No. CN105516754, Apr. 20, 2016, 32 pages.
Machine Translation and Abstract of Chinese Publication No. CN105959748, Sep. 21, 2016, 9 pages.
Machine Translation and Abstract of Chinese Publication No. CN106095237, Nov. 9, 2016, 30 pages.
Machine Translation and Abstract of Chinese Publication No. CN106453538, Feb. 22, 2017, 31 pages.
"What is Screen Mirroring and Flow Do I Use It with My Samsung TV and Samsung Mobile Device," May 16, 2017, 9 pages.
Foreign Communication From a Counterpart Application, PCT Application No. PCT/CN2017/088140, English Translation of International Search Report dated Mar. 12, 2018, 3 pages.
Foreign Communication From a Counterpart Application, PCT Application No. PCT/CN2017/088140, English Translation of Written Opinion dated Mar. 12, 2018, 5 pages.
Foreign Communication From a Counterpart Application, Chinese Application No. 201780008031.3, Chinese Office Action dated Aug. 30, 2019, 9 pages.

* cited by examiner

DISPLAY METHOD AND APPARATUS

CROSS-REFERENCE TO RELATED APPLICATIONS

This application is a US, National Stage of international Patent Application No. PCT/CN2017/088140 filed on Jun. 13, 2017, which is hereby incorporated by reference in its entirety.

TECHNICAL FIELD

Embodiments of this application relate to the field of communications technologies, and in particular, to a display method and an apparatus.

BACKGROUND

Using a mobile terminal as a personal computer (personal computer, PC) is one of important means to implement mobile officing. Specifically, the mobile terminal such as a mobile phone can project display content on a screen of the mobile phone onto a large-screen display such as a large-screen display of a PC by using a wireless video display (Wi-Fi Display) function or a Microsoft continuum (continuum) function, so that the mobile phone can also be used as the PC after the mobile phone connects to the large-screen display.

Currently, after the mobile phone connects to the large-screen display, the mobile phone may heterogeneously project an application on the mobile phone onto the large-screen display. In other words, after the mobile phone of a user connects to the large-screen display, the mobile phone may control a display screen of the mobile phone and the large-screen display to independently run two display interfaces. In this way, the user may send an email and a short message on the mobile phone and watch a movie on the large-screen display at the same time.

However, when the display screen of the mobile phone and the large-screen display independently run their respective display interfaces, the user needs to control the large-screen display to open an application by using the mobile phone and with assistance of an additional input device, for example, a mouse or a stylus. Consequently, a process of switching the application between a plurality of screens is cumbersome and user experience is relatively poor.

SUMMARY

Embodiments of this application provide a display method and an apparatus, to resolve a technical problem of low efficiency when a terminal switches an application between a plurality of screens to display the application, thereby improving user experience in using the terminal as a PC.

To achieve the foregoing objectives, the following technical solutions are used in the embodiments of this application:

According to a first aspect, an embodiment of this application provides a display method, including: after a first terminal connects to a second terminal, obtaining, by the first terminal, a first gesture made by a user on a target shortcut in a first display interface, where the first display interface is an interface presented on the first terminal, and target content corresponding to the target shortcut is not running in a foreground of the first terminal; and sending, by the first terminal, first display data to the second terminal based on the first gesture, so that the second terminal displays the first display data in a second display interface, where the first display data is data correlated with the target content, and the second display interface is an interface presented on the second terminal. In this way, the user can control, on the first terminal, both display content on the first terminal and display content the second terminal, thereby reducing complexity in switching an application between a plurality of terminal displays, and improving user experience when a terminal performs multi-screen display.

In a possible design method, the target shortcut is an icon of a target application, the first display data is used to indicate a display interface that is displayed when the target application is started, and that target content corresponding to the target shortcut is not running in a foreground of the first terminal includes: the target application is not started on the first terminal.

In a possible design method, the target shortcut is an identifier of a target application, the first display data is used to indicate a display interface that is displayed when the target application is running, and that target content corresponding to the target shortcut is not running in a foreground of the first terminal includes: the target application is running in a background of the first terminal.

In a possible design method, the target shortcut is an icon of a target file, the first display data is the target file, and that target content corresponding to the target shortcut is not running in a foreground of the first terminal includes: the target file is not opened in the first display interface.

In a possible design method, the target shortcut is an identifier of a target file, the first display data is the target file, and that target content corresponding to the target shortcut is not running in a foreground of the first terminal includes: the target file is running in a background of the first terminal.

In a possible design method, after the obtaining, by the first terminal, a first gesture made by a user on a target shortcut, the method further includes: obtaining, by the first terminal, a device running status of the first terminal, where the device running status includes at least one of a battery level, network quality, a memory size, and CPU usage of the first terminal, where the sending, by the first terminal, first display data to the second terminal based on the first gesture includes: sending, by the first terminal, the first display data to the second terminal when the device running status of the first terminal does not support displaying of the target content in the first display interface.

In a possible design method, after the sending, by the first terminal, first display data to the second terminal based on the first gesture, the method further includes: ceasing to display, by the first terminal in the first display interface, the target content corresponding to the target shortcut.

In a possible design method, after the first terminal connects to the second terminal, the method further includes: sending, by the first terminal, second display data to the second terminal, so that the second terminal displays M shortcuts in the second display interface, where the M shortcuts are shortcuts of applications that are installed on the first terminal and that have a same or similar attribute, and M>0.

In a possible design method, after the sending, by the first terminal, first display data to the second terminal based on the first gesture, the method further includes: obtaining, by the first terminal, a second gesture triggered by the user in the first display interface; stopping sending, by the first terminal in response to the second gesture, the first display data to the second terminal; and displaying, by the first terminal in the first display interface, third display data correlated with the first display data, where a display element included in the third display data is the same as a display element included in the first display data.

According to a second aspect, an embodiment of this application provides a display method, including: after a first terminal connects to a second terminal, obtaining, by the first terminal, a first gesture made by a user on target content in a first display interface, where the first display interface is an interface presented on the first terminal, and the target content is running in a foreground of the first terminal; sending, by the first terminal, first display data to the second terminal based on the first gesture, so that the second terminal displays the first display data in a second display interface, where the first display data is data correlated with the target content, and the second display interface is an interface presented on the second terminal; and stopping displaying, by the first terminal, the target content in the first display interface.

In a possible design method, the target content is a target application that is running in the foreground of the first terminal, and the first display data is used to indicate a display interface that is displayed when the target application is running.

In a possible design method, when the target application is a video type application, video playback progress displayed in the first display interface is the same as video playback progress displayed in the second display interface; or when the target application is an instant messaging type application, a chat record in a chat window in the first display interface is the same as a chat record in a chat window in the second display interface; or when the target application is a game type application, a game system interface displayed in the first display interface is the same as a game system interface displayed in the second display interface.

In a possible design method, the target content is a target file that is being displayed on the first terminal, and the first display data includes the target file.

In a possible design method, an interface element displayed in the first display interface is the same as an interface element displayed in the second display interface.

According to a second aspect, an embodiment of this application provides a display method, including: starting, by a first terminal, a target application in a first display interface, where the first display interface is an interface presented on the first terminal; sending, by the first terminal, first display data to a second terminal after the first terminal connects to the second terminal, so that the second terminal displays an icon of the target application in a second display interface, where the first display data is used to indicate the icon of the target application, and the second display interface is an interface presented on the second terminal; and sending, by the first terminal, second display data to the second terminal when detecting that a user triggers the icon of the target application in the second display interface, so that the second terminal runs the target application in the second display interface, where the second display data is used to indicate a display interface that is displayed when the target application is running.

In a possible design method, when the target application is a video type application, video playback progress displayed in the first display interface is the same as video playback progress displayed in the second display interface; or when the target application is an instant messaging type application, a chat record in a chat window in the first display interface is the same as a chat record in a chat window in the second display interface; or when the target application is a game type application, a game system interface displayed in the first display interface is the same as a game system interface displayed in the second display interface.

In a possible design method, after the sending, by the first terminal, second display data to the second terminal, the method further includes: stopping sending, by the first terminal when detecting a target gesture triggered by the user, the second display data to the second terminal; and displaying, by the first terminal in the first display interface, third display data correlated with the second display data, where an interface element included in the third display data is the same as an interface element included in the second display data.

According to a fourth aspect, an embodiment of this application provides a terminal, including a display, a processor, a transmitter, a receiver, a communications interface, and an input device that are connected by using a bus. The communications interface is configured to set up a connection between the terminal and another terminal; the input device is configured to obtain a first gesture made by a user on a target shortcut in a first display interface, where the first display interface is an interface presented on the display, and target content corresponding to the target shortcut is not running in a foreground of the terminal; the processor is configured to generate, based on the first gesture, first display data correlated with the target content; and the transmitter is configured to send the first display data to the another terminal, so that the another terminal displays the first display data in a second display interface, where the second display interface is an interface presented on the another terminal.

In a possible design method, the target shortcut is an icon of a target application, the first display data is used to indicate a display interface that is displayed when the target application is started, and that target content corresponding to the target shortcut is not running in a foreground of the terminal includes: the target application is not started on the terminal.

In a possible design method, the target shortcut is an identifier of a target application, the first display data is used to indicate a display interface that is displayed when the target application is running, and that target content corresponding to the target shortcut is not running in a foreground of the terminal includes: the target application is running in a background of the terminal.

In a possible design method, the target shortcut is an icon of a target file, the first display data is the target file, and that target content corresponding to the target shortcut is not running in a foreground of the terminal includes: the target file is not opened in the first display interface.

In a possible design method, the target shortcut is an identifier of a target file, the first display data is the target file, and that target content corresponding to the target shortcut is not running in a foreground of the terminal includes: the target file is running in a background of the terminal.

In a possible design method, the processor is configured to: obtain a device running status of the terminal, where the device running status includes at least one of a battery level, network quality, a memory size, and CPU usage of the terminal; and determine whether the device running status of the terminal supports displaying of the target content in the first display interface; and the transmitter is specifically configured to send the first display data to the another terminal when the device running status of the terminal does not support displaying of the target content in the first display interface.

In a possible design method, the display is further configured to cease to display, in the first display interface, the target content corresponding to the target shortcut.

In a possible design method, the transmitter is further configured to send second display data to the another terminal, so that the another terminal displays M shortcuts in the second display interface, where the M shortcuts are shortcuts of applications that are installed on the terminal and that have a same or similar attribute, and M>0.

In a possible design method, the input device is further configured to obtain a second gesture triggered by the user in the first display interface; the transmitter is further configured to stop sending, in response to the second gesture, the first display data to the another terminal; and the display is further configured to display, in the first display interface, third display data correlated with the first display data, where a display element included in the third display data is the same as a display element included in the first display data.

According to a fifth aspect, an embodiment of this application provides a terminal, including a display, a processor, a transmitter, a receiver, a communications interface, and an input device that are connected by using a bus. The communications interface is configured to connect, by the terminal, to another terminal; the input device is configured to obtain a first gesture made by a user on target content in a first display interface, where the first display interface is an interface presented on the display, and the target content is running in a foreground of the terminal; the processor is configured to generate first display data correlated with the target content; the transmitter is configured to send the first display data to the another terminal, so that the another terminal displays the first display data in a second display interface, where the second display interface is an interface presented on the another terminal; and the display is further configured to stop displaying the target content in the first display interface presented on the display.

In a possible design method, the target content is a target application that is running in the foreground of the terminal, and the first display data is used to indicate a display interface that is displayed when the target application is running.

In a possible design method, when the target application is a video type application, video playback progress displayed in the first display interface is the same as video playback progress displayed in the second display interface; or when the target application is an instant messaging type application, a chat record in a chat window in the first display interface is the same as a chat record in a chat window in the second display interface; or when the target application is a game type application, a game system interface displayed in the first display interface is the same as a game system interface displayed in the second display interface.

In a possible design method, the target content is a target file that is being displayed on the terminal, and the first display data includes the target file.

In a possible design method, an interface element displayed in the first display interface is the same as an interface element displayed in the second display interface.

According to a sixth aspect, an embodiment of this application provides a terminal, including a display, a processor, a transmitter, a receiver, a communications interface, and an input device that are connected by using a bus. The processor is configured to start a target application in a first display interface, where the first display interface is an interface presented on the display; the communications interface is configured to connect, by the terminal, to another terminal; the transmitter is configured to: send first display data to the another terminal, so that the another terminal displays an icon of the target application in a second display interface, where the first display data is used to indicate the icon of the target application, and the second display interface is an interface presented on the another terminal; and send second display data to the another terminal when detecting that a user triggers the icon of the target application in the second display interface, so that the another terminal runs the target application in the second display interface, where the second display data is used to indicate a display interface that is displayed when the target application is running.

In a possible design method, when the target application is a video type application, video playback progress displayed in the first display interface is the same as video playback progress displayed in the second display interface; or when the target application is an instant messaging type application, a chat record in a chat window in the first display interface is the same as a chat record in a chat window in the second display interface; or when the target application is a game type application, a game system interface displayed in the first display interface is the same as a game system interface displayed in the second display interface.

In a possible design method, the transmitter is further configured to stop sending, when detecting a target gesture triggered by the user, the second display data to the another terminal; and the display is further configured to display, in the first display interface, third display data correlated with the second display data, where an interface element included in the third display data is the same as an interface element included in the second display data.

According to a seventh aspect, an embodiment of this application provides a terminal, including: a connection unit, configured to connect to another terminal; an obtaining unit, configured to obtain a first gesture made by a user on a target shortcut in a first display interface, where the first display interface is an interface presented on the terminal, and target content corresponding to the target shortcut is not running in a foreground of the terminal; and a sending unit, configured to send first display data to the another terminal based on the first gesture, so that the another terminal displays the first display data in a second display interface, where the first display data is data correlated with the target content, and the second display interface is an interface presented on the another terminal.

In a possible design method, the target shortcut is an icon of a target application, the first display data is used to indicate a display interface that is displayed when the target application is started, and that target content corresponding to the target shortcut is not running in a foreground of the terminal includes: the target application is not started on the terminal.

In a possible design method, the target shortcut is an identifier of a target application, the first display data is used to indicate a display interface that is displayed when the target application is running, and that target content corresponding to the target shortcut is not running in a foreground of the terminal includes: the target application is running in a background of the terminal.

In a possible design method, the target shortcut is an icon of a target file, the first display data is the target file, and that target content corresponding to the target shortcut is not running in a foreground of the terminal includes: the target file is not opened in the first display interface.

In a possible design method, the target shortcut is an identifier of a target file, the first display data is the target file, and that target content corresponding to the target shortcut is not running in a foreground of the terminal includes: the target file is running in a background of the terminal.

In a possible design method, the obtaining unit is further configured to obtain a device running status of the terminal, where the device running status includes at least one of a battery level, network quality, a memory size, and CPU usage of the terminal; and the sending unit is specifically configured to send the first display data to the another terminal when the device running status of the terminal does not support displaying of the target content in the first display interface.

In a possible design method, the terminal further includes a display unit, configured to cease to display, in the first display interface, the target content corresponding to the target shortcut.

In a possible design method, the sending unit is further configured to send second display data to the another terminal, so that the another terminal displays M shortcuts in the second display interface, where the M shortcuts are shortcuts of applications that are installed on the terminal and that have a same or similar attribute, and M>0.

In a possible design method, the obtaining unit is further configured to obtain a second gesture triggered by the user in the first display interface; the sending unit is further configured to stop sending, in response to the second gesture, the first display data to the another terminal; and the display unit is further configured to display, in the first display interface, third display data correlated with the first display data, where a display element included in the third display data is the same as a display element included in the first display data.

According to an eighth aspect, an embodiment of this application provides a terminal, including: a connection unit, configured to connect to another terminal; an obtaining unit, configured to obtain a first gesture made by a user on target content in a first display interface, where the first display interface is an interface presented on the terminal, and the target content is running in a foreground of the terminal; a sending unit, configured to send first display data to the another terminal based on the first gesture, so that the another terminal displays the first display data in a second display interface, where the first display data is data correlated with the target content, and the second display interface is an interface presented on the another terminal; and a display unit, configured to stop displaying the target content in the first display interface.

In a possible design method, the target content is a target application that is running in the foreground of the terminal, and the first display data is used to indicate a display interface that is displayed when the target application is running.

In a possible design method, when the target application is a video type application, video playback progress displayed in the first display interface is the same as video playback progress displayed in the second display interface; or when the target application is an instant messaging type application, a chat record in a chat window in the first display interface is the same as a chat record in a chat window in the second display interface; or when the target application is a game type application, a game system interface displayed in the first display interface is the same as a game system interface displayed in the second display interface.

In a possible design method, the target content is a target file that is being displayed on the terminal, and the first display data includes the target file.

In a possible design method, an interface element displayed in the first display interface is the same as an interface element displayed in the second display interface.

According to a ninth aspect, an embodiment of this application provides a terminal, including: a display unit, configured to start a target application in a first display interface, where the first display interface is an interface presented on the terminal; a sending unit, configured to: send first display data to another terminal after the first connects to the another terminal, so that the another terminal displays an icon of the target application in a second display interface, where the first display data is used to indicate the icon of the target application, and the second display interface is an interface presented on the another terminal; and send second display data to the another terminal when detecting that a user triggers the icon of the target application in the second display interface, so that the another terminal runs the target application in the second display interface, where the second display data is used to indicate a display interface that is displayed when the target application is running.

In a possible design method, when the target application is a video type application, video playback progress displayed in the first display interface is the same as video playback progress displayed in the second display interface; or when the target application is an instant messaging type application, a chat record in a chat window in the first display interface is the same as a chat record in a chat window in the second display interface; or when the target application is a game type application, a game system interface displayed in the first display interface is the same as a game system interface displayed in the second display interface.

In a possible design method, the sending unit is further configured to stop sending, when detecting a target gesture triggered by the user, the second display data to the another terminal; and the display unit is further configured to display, in the first display interface, third display data correlated with the second display data, where an interface element included in the third display data is the same as an interface element included in the second display data.

According to a tenth aspect, an embodiment of this application provides a terminal, including a processor, a memory, a bus, and a communications interface. The memory is configured to store a computer executable instruction. The processor is connected to the memory by using the bus, and when the terminal runs, the processor executes the computer executable instruction stored in the memory, so that the terminal performs any one of the foregoing display methods.

According to an eleventh aspect, an embodiment of this application provides a computer readable storage medium. The computer readable storage medium stores an instruction, and when the instruction runs on any one of the foregoing terminals, the terminal performs any one of the foregoing display methods.

According to a twelfth aspect, an embodiment of this application provides a computer program product including an instruction. When the computer program product runs on any one of the foregoing terminals, the terminal performs any one of the foregoing display methods.

In the embodiments of this application, names of the foregoing terminals constitute no limitation on the devices. In actual implementation, these devices may appear in other names. The devices fall within the scope of the claims of this application and their equivalent technologies, provided that functions of the devices are similar to those in the embodiments of this application.

DESCRIPTION OF EMBODIMENTS

The terms "first" and "second" in the following are used merely for a purpose of description, and shall not be understood as an indication or implication of relative importance or implicit indication of a quantity of indicated technical features. Therefore, a feature restricted by "first" or "second" may explicitly indicate or implicitly include one or more such features. In the descriptions in the embodiments of this application, unless otherwise provided, "a plurality of" means two or more than two.

Figure 1:
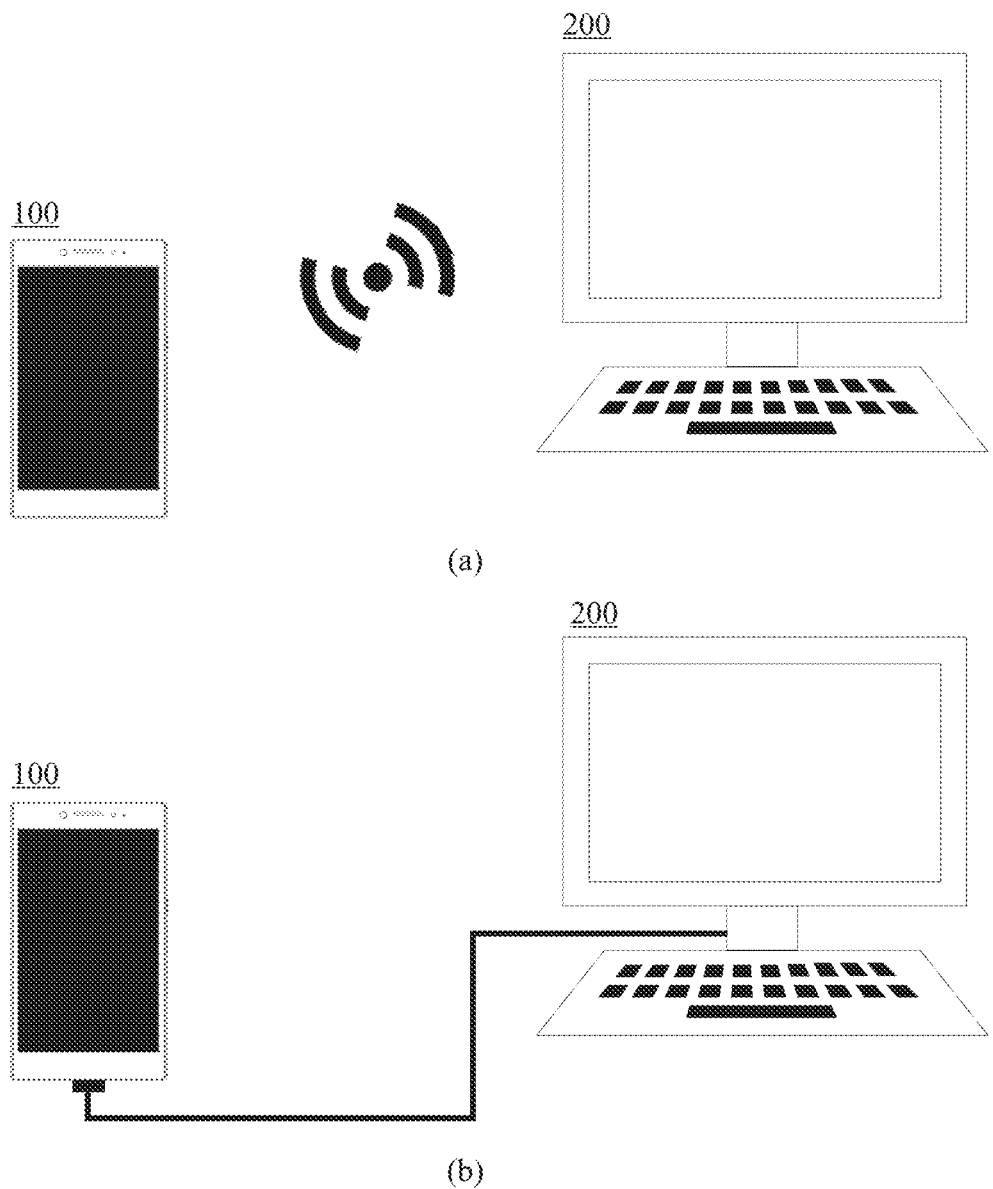
FIG. 1 is a schematic diagram 1 of an application scenario of a display method according to an embodiment of this application.

The embodiments of this application provide a display method. The method may be applied to mobile officing and another application scenario in which a terminal needs to perform multi-screen display. For example, as shown in FIG. 1, a first terminal 100 may be a mobile phone, a second terminal 200 may be a desktop computer or a standalone display. As shown in (a) in FIG. 1, the first terminal 10) may connect to the second terminal 200 in a wireless communication mode (for example, Wi-Fi); or as shown in (b) in FIG. 1, the first terminal 100 may communicatively connect to the second terminal 200 in a wired communication mode (for example, a data cable). This is not limited in this embodiment of this application.

The first terminal 100 may serve as a controlling device, and the second terminal 200 may serve as a controlled device of the first terminal 100. After the first terminal 100 connects to the second terminal 200, it means that the first terminal 100 has two displays: one is a display of the first terminal 100, and the other is a display of the second terminal 200 connected to the first terminal 100.

Currently, after the first terminal 100 connects to the second terminal 200, the first terminal 100 may display related display content (for example, an application icon), on a desktop, on both the display of the first terminal 100 and the display of the second terminal 200. In this way, a user may perform a series of touch operations on the first terminal 10) to implement a corresponding function of a related application, for example, tap an icon of a video application on the first terminal 100 to watch a video. However, when the user needs to continue to watch the video on the second terminal 200 by using the video application, the user needs to connect a mouse to the first terminal 100, or use a touchscreen of the first terminal 100 as an input device, to adjust a cursor on the second terminal 200 to an icon location of the video application to perform a double-tap operation, to re-open the video application.

It may be learned that after the first terminal 100 connects to the second terminal 200, although a function of simultaneously controlling display interfaces on the two displays (namely, the display of the first terminal 100 and the display of the second terminal 200) by the first terminal 100 is implemented, when the user needs to switch an application between different terminals, the user needs to frequently switch the application manually. Consequently, user experience in using the terminal as a PC is reduced and the user has relatively low operation efficiency.

In this embodiment of this application, after the first terminal 100 connects to the second terminal 200, the first terminal 100 may project an application installed on the first terminal 100 onto the display of the second terminal 200 by using a homogenous display method or a heterogenous display method.

Homogenous display means that signal sources of display interfaces on different displays, such as the display of the first terminal 100 and the display of the second terminal 200, are the same. Heterogenous display means that a signal source of a display interface on the display of the first terminal 100 is independent of a signal source of a display interface on the display of the second terminal 200.

Figure 2A:
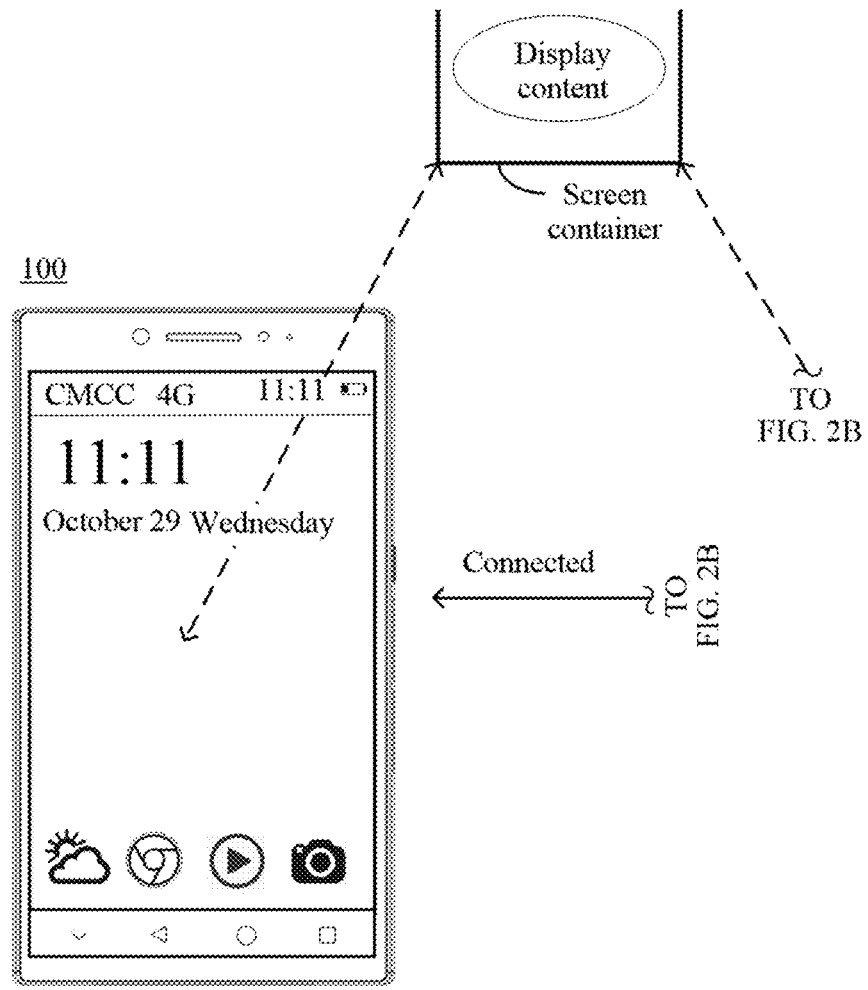
FIG. 2A and FIG. 2B are a schematic diagram 2 of an application scenario of a display method according to an embodiment of this application.
Figure 2B:
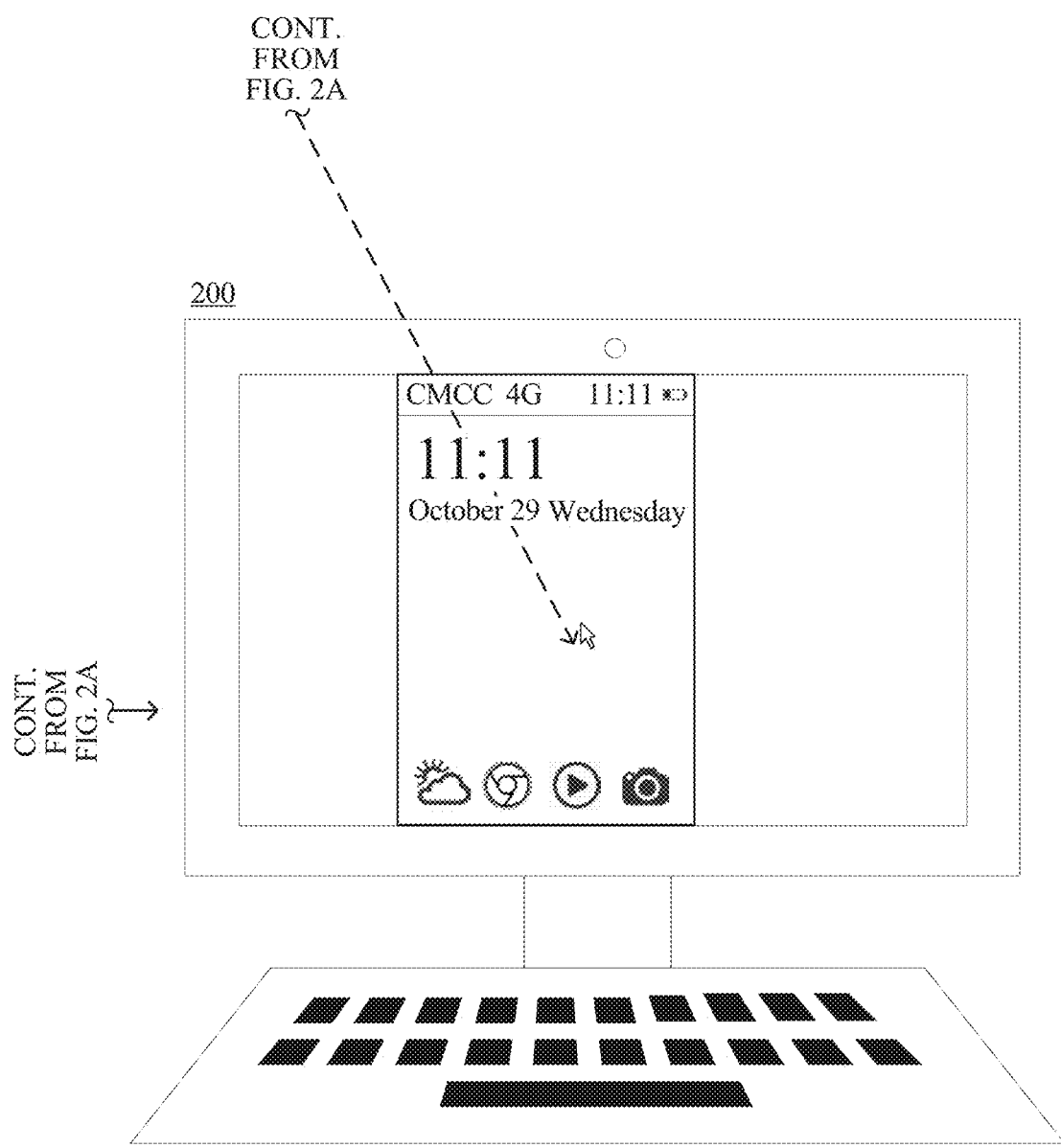

When the first terminal heterogeneously projects the application installed on the first terminal onto the display of the second terminal, as shown in FIG. 2 FIG. 2A and FIG. 2B, before the first terminal 100 connects to the second terminal 200, the first terminal 100 stores generated to-be-displayed display content in a screen container in a memory. In this way, the display of the first terminal 100) can display a related image simply by reading the display content from the screen container. After the first terminal 100 connects to the second terminal 200, still as shown in FIG. 2A and FIG. 2B, the display of the second terminal 200 may read the display content from the screen container to display the display content the same as that on the first terminal 100, to implement simultaneous display of the first terminal 100 and the second terminal 200.

Figure 3A:
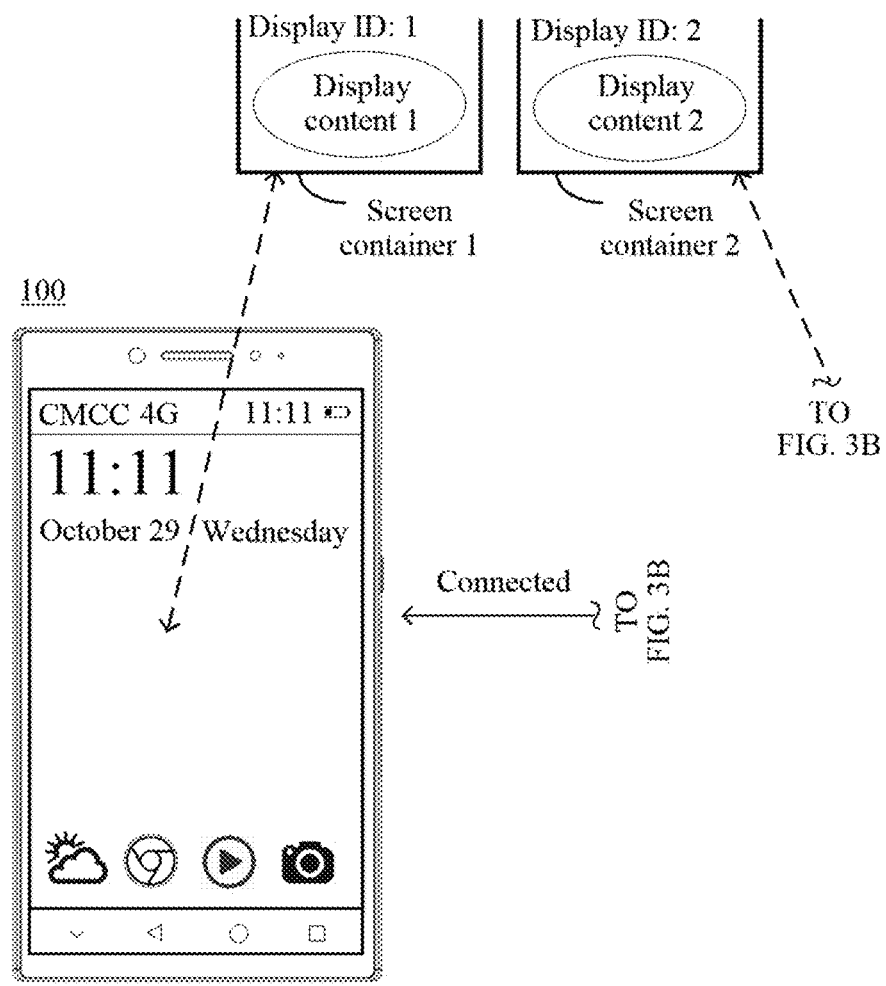
FIG. 3A and FIG. 3B are a schematic diagram 3 of an application scenario of a display method according to an embodiment of this application.
Figure 3B:
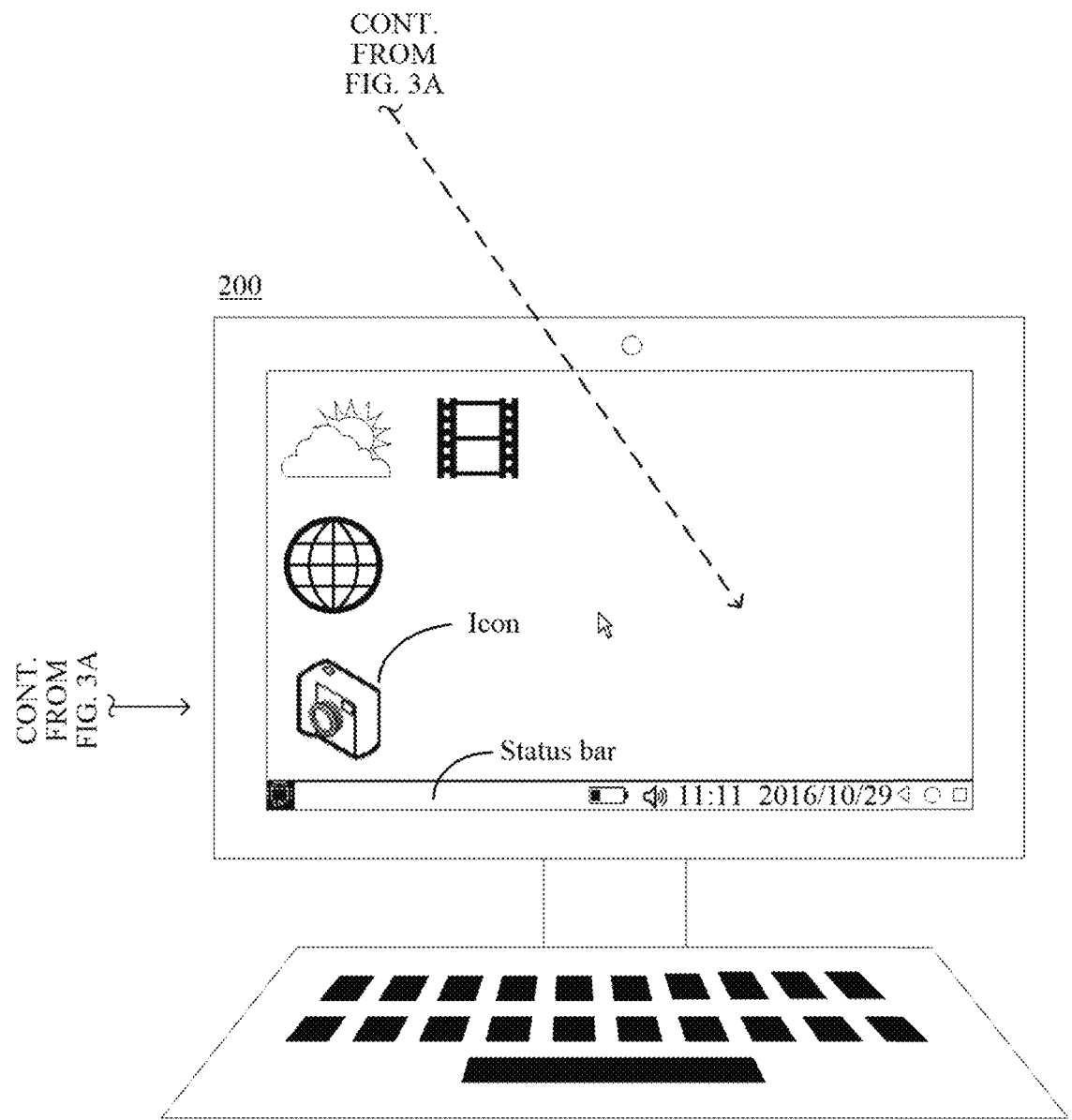

When the first terminal 100 heterogeneously projects the application installed on the first terminal 100 onto the display of the second terminal 200, as shown in FIG. 3A and FIG. 3B, before the first terminal 100 connects to the second terminal 200, the first terminal 100 stores generated to-be-displayed display content 1 in a screen container 1 in a memory. In this way, the display of the first terminal 100 can display a related image simply by reading the display content 1 from the screen container 1.

After the first terminal 100 connects to the second terminal 200, the first terminal 100 may identify related specification information of the display of the second terminal 200 connected to the first terminal 100, for example, a resolution and dots per inch (Dots Per Inch, DPI) of the display of the second terminal 200. In this case, the first terminal 100 may set up, in a memory of the first terminal 100, an independent screen container, namely, a screen container 2 in FIG. 3A and FIG. 3B, for the second terminal 200 based on the specification information of the display of the second terminal 200. The screen container 2 and the screen container 1 may be distinguished by using different display identifiers (Display ID).

After connecting to the second terminal 200, still as shown in FIG. 3A and FIG. 3B, the first terminal 100 may initialize the display of the second terminal 200, convert information such as an application icon on the first terminal 100 into desktop display content, such as an application icon, an icon layout, and a status bar, that matches the specification information of the second terminal 200, and store the desktop display content in the screen container 2. In this way, the display of the second terminal 200 can independently project all applications installed on the first terminal 100 onto the display of the second terminal 200 simply by reading the desktop display content stored in the screen container 2, to complete a process of initializing the display of the second terminal 200. Subsequently, the first terminal 100 and the second terminal 200 may independently run the two display interfaces in a same operating system simply by reading the display content from the respective screen containers of the terminals.

Certainly, in a heterogeneous projection system shown in FIG. 3A and FIG. 3B, the display content in the screen container 1 may alternatively be the same as the display content in the screen container 2 (for example, both the display content in the screen container 1 and the display content in the screen container 2 each are a display interface at the tenth minute of a video A). Alternatively, the first terminal 100 may convert the display content in the screen container 1 into display content that matches the specification information of the second terminal 200 and then store the display content in the screen container 2 (for example, adjust a resolution of a photo A in the screen container 1 to a resolution value that matches the display of the second terminal 200, and store, in the screen container 2, a photo A obtained after the conversion). In this way, the display content on the display of the first terminal 100 may be simultaneously displayed in the display of the second terminal 200.

Specifically, in this embodiment of this application, to save the user from a trouble in frequently switching an application between a plurality of display interfaces, the first terminal 100 may receive a specific gesture made by the user on target content or a target shortcut in the display interface (namely, a first display interface) of the first terminal 100, to trigger the first terminal 100 to store, in the screen container 2 corresponding to a display ID 2, display data (for example, first display data) generated by a related application. Then the first terminal 100 sends the first display data in the screen container 2 to the second terminal, so that the display of the second terminal 200 can read the first display data from the screen container 2 and display the first display data in a second display interface of the second terminal 200. In this way, the user can control, on the first terminal 100, both display content on the first terminal 100 and display content the second terminal 200, thereby reducing complexity in switching an application between a plurality of terminal displays, and improving user experience when a terminal performs multi-screen display.

For example, after the user opens an application A on the first terminal 100, the first terminal 100 stores, in the screen container 1, generated related display content of the application A. If the user performs, in the current first display interface, a preset press operation (namely, the specific gesture) in a window (namely, the target content) of the application A, after detecting the press operation, the first terminal 100 stores, in the screen container 2, the related display content (namely, the first display data) that is of the application A and that is in the screen container 1. In this way, the display of the second terminal 200 can read the related display content of the application A from the screen container 2 and display the related display content of the application A. It may be learned that the user can implement seamless switching of the application A between the first terminal 100 and the second terminal 200 simply by performing only one press operation. This improves efficiency in switching an application when the terminal performs multi-screen display.

It should be noted that the foregoing screen container may be specifically an application stack that is set up when a terminal (for example, the first terminal) runs an application. Content at the top of the application stack is usually content that is currently run and displayed on the terminal. For example, the application A generates a plurality of tasks (task) in an application stack of the application A during running, and the terminal executes each task starting from a stack top, outputs an execution result of each task, and displays the execution result on a display of the terminal.

The foregoing shortcut is a command line used to quickly start a task, for example, a link provided by a system to quickly start a program or open a file or a file folder. The shortcut may usually exist in a form of an icon. The shortcut is a general term of a plurality of possible operation entries. The shortcut may be but is not limited to an application program, a specific function, a contact, a setting option, a notification bar, a shortcut operation bar, and the like.

In this embodiment of this application, the shortcut may be an icon for starting an application program, for example, an icon for starting one of the following application programs: WeChat, Google search, a camera, and the like. Alternatively, the shortcut may be an identifier of an application program running in a background, for example, an application window of WeChat in a multitask window. Certainly, the shortcut may be an icon of a target file that is not opened in a terminal, for example, a thumbnail of a photo A in a gallery. Alternatively, the shortcut may be an identifier of a target file that is opened in a background of a terminal, for example, a window in which the photo A is located in a multitask window. This is not limited in this embodiment of this application.

In addition, when the second terminal 200 displays the display content in the screen container 2 in the second display interface, the first terminal 100 may adjust the display content in the screen container 2 and a display layout in the second display interface, based on parameters such as a screen resolution of the second terminal 200 and an operation habit of using the second terminal 200 by a user, for example, may adjust a size, a location, an icon, and the like of the display content. This is not limited in this embodiment of this application.

The display method provided in the embodiments of this application may be applied to any terminal such as a mobile phone, a wearable device, an AR (augmented reality)\VR (virtual reality) device, a tablet computer, a notebook computer, an UMPC (ultra-mobile personal computer), a netbook, and a PDA (personal digital assistant). This is not limited in this embodiment of this application.

Figure 4:
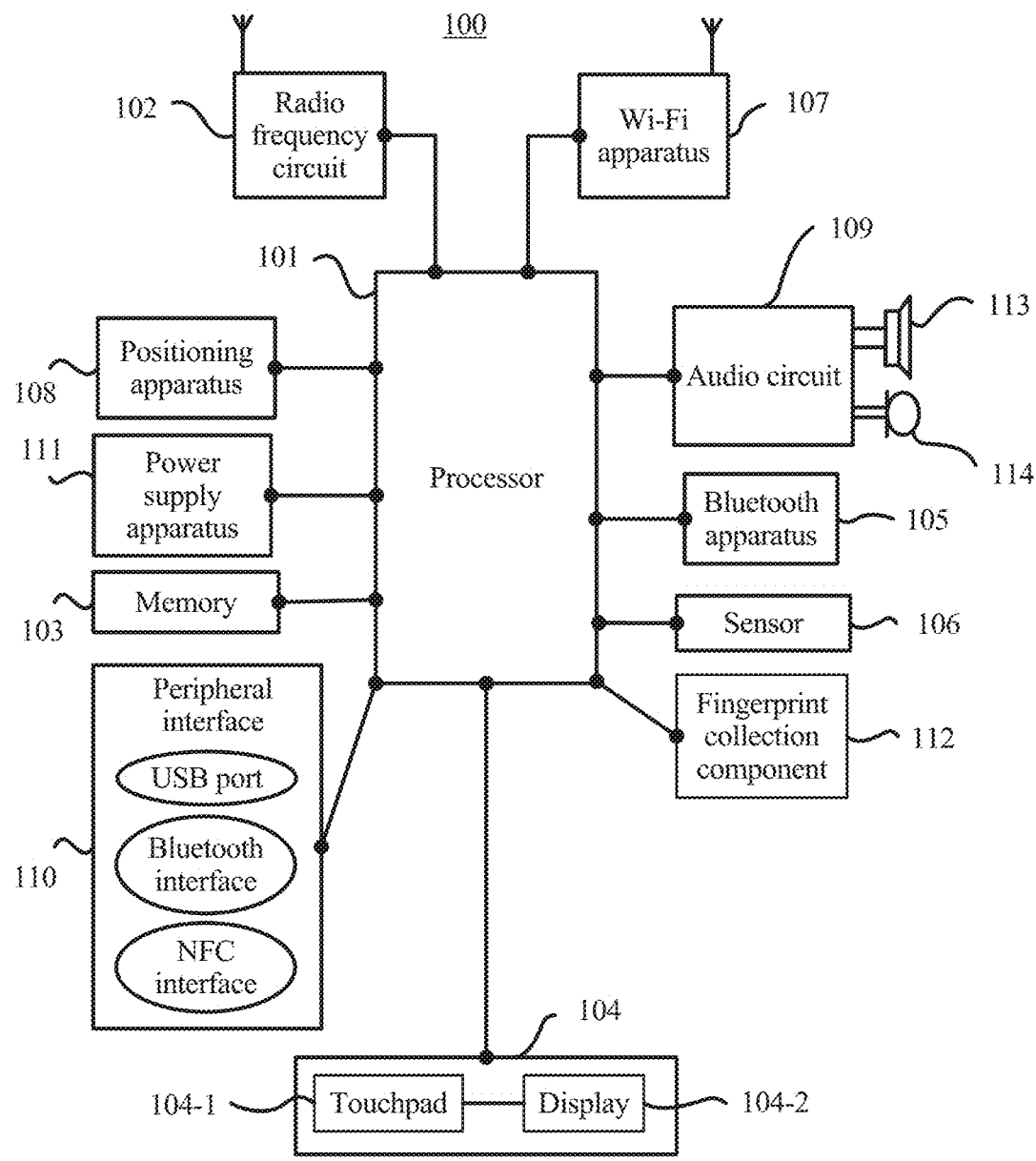
FIG. 4 is a schematic structural diagram 1 of a terminal according to an embodiment of this application.

As shown in FIG. 4, the first terminal 100 (or the second terminal 200) in this embodiment of this application may be a mobile phone 100. This embodiment is described in detail by using the mobile phone 100 as an example. It should be understood that the mobile phone 100 shown in the figure is merely an example of the terminal, and the mobile phone 100 may include more or fewer components than those shown in the figure, may combine two or more components, or may have different component configurations.

As shown in FIG. 4, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a communications interface 110, and a power supply system 111. These components may communicate with each other by using one or more communications buses or signal cables (not shown in FIG. 4). A person skilled in the art may understand that a hardware structure shown in FIG. 4 constitutes no limitation on the mobile phone. The mobile phone 100 may include more or fewer components than those shown in the figure, or combine some components, or have different component arrangements.

The components of the mobile phone 100 are described below in detail with reference to FIG. 4.

The processor 101 is a control center of the mobile phone 100. The processor 101 is connected to all parts of the mobile phone 100 by using various interfaces and lines, and performs various functions of the mobile phone 100 and data processing by running or executing an application program (which may be briefly referred to as an App below) stored in the memory 103, and by invoking data stored in the memory 103. In some embodiments, the processor 101 may include one or more processing units. For example, the processor 101 may be a Kirin 960 chip manufactured by Huawei Technologies Co., Ltd.

The radio frequency circuit 102 may be configured to receive and send a radio signal during information receiving and sending or during a call. In particular, the radio frequency circuit 102 may receive downlink data from a base station and then send the downlink data to the processor 101 for processing, and send uplink data to the base station. A radio frequency circuit usually includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communication standard or protocol, including but not limited to a Global System for Mobile Communications, a general packet radio service, Code Division Multiple Access, Wideband Code Division Multiple Access, Long Term Evolution, an email, a short messaging service, and the like.

The memory 103 is configured to store an application program and data. The processor 101 runs the application program and the data stored in the memory 103, to perform various functions of the mobile phone 100 and process the data. The memory 103 mainly includes a program storage area and a data storage area. The program storage area may store an operating system and an application program (such as a sound playing function or an image playing function) that is required by at least one function. The data storage area may store data (such as audio data or a phonebook) that is created based on use of the mobile phone 100. In addition, the memory 103 may further include a high-speed random access memory, and may include a nonvolatile memory, for example, a magnetic disk storage device, a flash storage device, or another volatile solid-state storage device. The memory 103 may store various operating systems, for example, an iOS operating system developed by Apple Inc. or an Android operating system developed by Google Inc.

The touchscreen 104 may include a touchpad 104-1 and a display 104-2. The touchpad 104-1 may collect a touch event (for example, an operation performed by a user on the touchpad 104-1 or near the touchpad 104-1 by using any appropriate object such as a finger or a stylus) performed by a user of the mobile phone 100 on or near the touchpad 104-1 and send collected touch information to another device such as the processor 101. Although the touchpad 104-1 and the display screen 104-2 serve as two independent components in FIG. 4 to implement input and output functions of the mobile phone 100, in some embodiments, the touchpad 104-1 and the display screen 104-2 may be integrated to implement the input and output functions of the mobile phone 100. It may be understood that the touchscreen 104 is made of a plurality of layers of materials that are stacked together. In this embodiment of this application, only the touchpad (layer) and the display screen (layer) are displayed, and other layers are not recorded in this embodiment of this application. In addition, in some other embodiments of this application, the touchpad 104-1 may cover the display screen 104-2, and a size of the touchpad 104-1 is greater than a size of the display screen 104-2, so that the display screen 104-2 is fully covered by the touchpad 104-1. Alternatively, the touchpad 104-1 may be configured in a form of a full panel on a front surface of the mobile phone 100. In other words, all touches of a user on the front surface of the mobile phone 100 can be sensed by the mobile phone. In this way, full-touch experience can be implemented on the front surface of the mobile phone. In some other embodiments, the touchpad 104-1 is configured in a form of a full panel on a front surface of the mobile phone 100, and the display screen 104-2 is also configured in a form of a full panel on the front surface of the mobile phone 100. In this way, a bezel-less structure can be implemented on the front surface of the mobile phone.

In this embodiment of this application, the mobile phone 100 may further have a fingerprint recognition function. For example, a fingerprint sensor 112 may be configured on a rear surface (for example, below a rear-facing camera) of the mobile phone 100, or a fingerprint sensor 112 may be configured on the front surface (for example, below the touchscreen 104) of the mobile phone 100. For another example, a fingerprint collection component 112 may be configured inside the touchscreen 104 to implement the fingerprint recognition function. In other words, the fingerprint collection component 112 may be integrated with the touchscreen 104 to implement the fingerprint recognition function of the mobile phone 100. In this case, the fingerprint collection component 112 may be configured inside the touchscreen 104 as a part of the touchscreen 104 or may be configured inside the touchscreen 104 in another manner. A fingerprint sensor is a main component of the fingerprint collection component 112 in this embodiment of this application. The fingerprint sensor may use any type of sensing technology, including but not limited to an optical sensing technology, a capacitive sensing technology, a piezoelectric sensing technology, an ultrasonic sensing technology, and the like.

In this embodiment of this application, the mobile phone 100 may further include the Bluetooth apparatus 105, configured to implement data exchange between the mobile phone 100 and another terminal (for example, a mobile phone or a smartwatch) at a short distance from the mobile phone 100. The Bluetooth apparatus in this embodiment of this application may be an integrated circuit, a Bluetooth chip, or the like.

The Wi-Fi apparatus 107 is configured to provide the mobile phone 100 with network access that complies with a Wi-Fi related standard protocol. The mobile phone 100 may gain access to a Wi-Fi access point by using the Wi-Fi apparatus 107, to help a user receive and send an email, browse a web page, access streaming media, and so on. The Wi-Fi apparatus 107 provides the user with wireless broadband Internet access. In some other embodiments, the Wi-Fi apparatus 107 may serve as a Wi-Fi radio access point and may provide another terminal with Wi-Fi network access.

The mobile phone 100 may further include at least one type of sensor 106, for example, an optical sensor, a motion sensor, or another sensor. Specifically, the optical sensor may include an ambient light sensor and a proximity sensor. The ambient light sensor may adjust luminance of the display of the touchscreen 104 based on brightness of ambient light, and the proximity sensor may turn off the display when the mobile phone 100 moves to an ear. As a type of motion sensor, an accelerometer sensor may detect an acceleration value in each direction (usually three axes), may detect a value and a direction of gravity when the accelerometer sensor is static, and may be applied to an application for recognizing a mobile phone gesture (such as switching between a landscape mode and a portrait mode, a related game, or magnetometer posture calibration), a function related to vibration recognition (such as a pedometer or a knock), and the like. For other sensors such as a gyroscope, a barometer, a hygrometer, a thermometer, and an infrared sensor that may be further configured on the mobile phone 100X), details are not described herein.

The positioning apparatus 108 is configured to provide the mobile phone 100 with a geographical location. It may be understood that the positioning apparatus 108 may be specifically a receiver in a positioning system such as a Global Positioning System (GPS), the BeiDou Navigation Satellite System, or the European GLONASS. After receiving a geographical location sent by the foregoing positioning system, the positioning apparatus 108 sends the information to the processor 101 for processing, or sends the information to the memory 103 for storage. In some other embodiments, the positioning apparatus 108 may be a receiver in an Assisted Global Positioning System (AGPS). The AGPS system serves as an assisted server to assist the positioning apparatus 108 in completing ranging and positioning services. In this case, the assisted positioning server provides positioning assistance by communicating with the positioning apparatus 108 (namely, a GPS receiver) in a terminal such as the mobile phone 100 by using a wireless communications network. In some other embodiments, the positioning apparatus 108 may be a positioning technology based on a Wi-Fi access point. Because each Wi-Fi access point has one globally unique MAC address, when Wi-Fi is enabled, the terminal can scan and collect a broadcast signal of a surrounding Wi-Fi access point. Therefore, the terminal can obtain a MAC address broadcast by the Wi-Fi access point. The terminal sends, to a location server by using a wireless communications network, the data (for example, the MAC address) that can identify the Wi-Fi access point. The location server retrieves a geographical location of each Wi-Fi access point, calculates a geographical location of the terminal with reference to strength of the Wi-Fi broadcast signal, and sends the geographical location of the terminal to the positioning apparatus 108 in the terminal.

The audio circuit 109, a loudspeaker 113, and a microphone 114 can provide an audio interface between a user and the mobile phone 100. The audio circuit 109 may transmit, to the loudspeaker 113, an electrical signal converted from received audio data, and the loudspeaker 113 converts the electrical signal into a sound signal for output. In addition, the microphone 114 converts the collected sound signal into an electrical signal. The audio circuit 109 receives the electrical signal, and then converts the electrical signal into audio data and outputs the audio data to the RF circuit 102, to send the audio data to, for example, another mobile phone, or output the audio data to the memory 103 for further processing.

The communications interface 110 is configured to provide various interfaces for an external input/output device (for example, a keyboard, a mouse, an external display, an external memory, and a subscriber identity module card). For example, the terminal is connected to a mouse or a display by using a universal serial bus (USB) port, is connected, by using a metal contact in a card slot of a subscriber identity module card, to the subscriber identity module card (SIM) provided by a telecommunications operator, and communicates with another terminal by using an interface of the Wi-Fi apparatus 107, an interface of a near field communication (NFC) apparatus, an interface of a Bluetooth module, and the like. The communications interface 110 may be used to couple the foregoing external input/output device to the processor 101 and the memory 103.

In this embodiment of this application, the first terminal 100 may connect to the display of the second terminal 200 by using the communications interface 110 of the first terminal 100, so that the first terminal 100 and the second terminal 200 can communicate with each other.

The mobile phone 100 may further include the power supply apparatus 111 (for example, a battery and a power management chip) that supplies power to all the components. The battery may be logically connected to the processor 101 by using the power management chip, to implement functions such as charging management, discharging management, and power consumption management by using the power supply apparatus 111.

Although not shown in FIG. 4, the mobile phone 100 may further include a camera (a front-facing camera and/or a rear-facing camera), a camera flash, a micro projection apparatus, a near field communication (NFC) apparatus, and the like. Details are not described herein.

Figure 5:
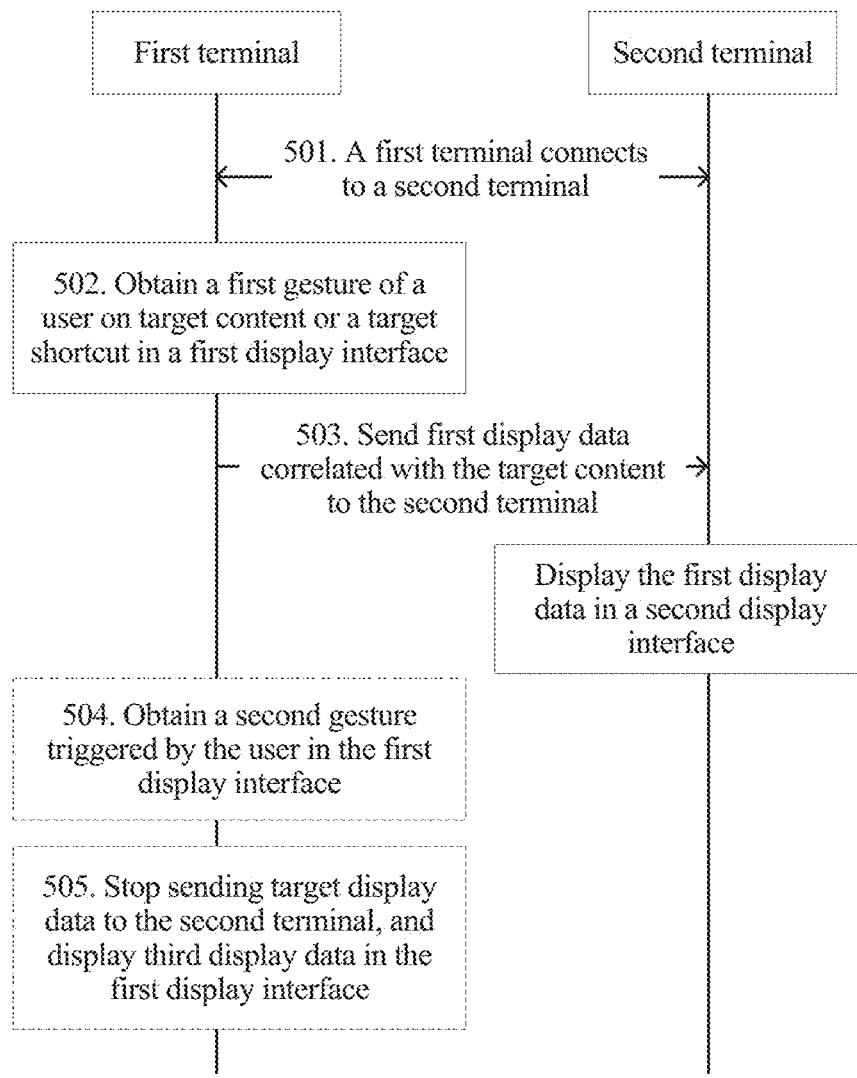
FIG. 5 is a schematic flowchart 1 of a display method according to an embodiment of this application.

A display method provided in an embodiment of this application is described below in detail with reference to specific embodiments. As shown in FIG. 5, the method includes the following steps.

501. A first terminal connects to a second terminal, so that the first terminal and the second terminal can communicate with each other.

The first terminal may connect to the second terminal by using Bluetooth, Wi-Fi, a ZigBee protocol (ZigBee), or another communication mode. This is not limited in this embodiment of this application.

502. The first terminal obtains a first gesture triggered by a user on target content or a target shortcut in a first display interface, where the first display interface is a display interface of the first terminal.

The first gesture may be any gesture customized by the user or preset in the first terminal, for example, a single tap, a floating touch gesture, a two-finger sliding gesture, or a press gesture. This is not limited in this embodiment of this application.

In addition, content corresponding to the target content or the target shortcut may be an interface element displayed in the first display interface. The interface element may be specifically an application, an application window, or a photo, a document, or the like that is selected from an application by a user. Alternatively, the target content may be a display control in a current display interface. This is not limited in this embodiment of this application.

For example, the content corresponding to the target shortcut may be an application running in a background of the first terminal, or an application that is not started on the first terminal, or may be content that is not running in a foreground of the first terminal, for example, a target file that is opened in a background of the first terminal. This is not limited in this embodiment of this application.

In this embodiment of this application, an application that can be operated by the user and that is being displayed on the terminal may be referred to as an application running in the foreground of the terminal, and an application that cannot be operated by the user currently but is also running on the terminal is referred to as a background application.

503. The first terminal sends first display data to the second terminal in response to the first gesture, so that the second terminal displays the first display data in a second display interface, where the second display interface is a display interface of the second terminal.

The first display data is display data correlated with the target content or the target shortcut. For example, when the target shortcut is an icon of an application A, the first display data correlated with the target shortcut may include display content that is in a display interface of the application A when the application A is started. When the target shortcut is a window of an application A in a multitask window, the first display data correlated with the target shortcut may include display content that is in a display interface of the application A when the application A is running. For another example, when the target content is a photo B that is being displayed, the first display data correlated with the target content may be display content (for example, gray-scale values of pixels in the photo B) of the photo B. A specific implementation of sending, by the first terminal, the first display data correlated with the target content to the second terminal is described below in detail with reference to specific embodiments.

Figure 6:
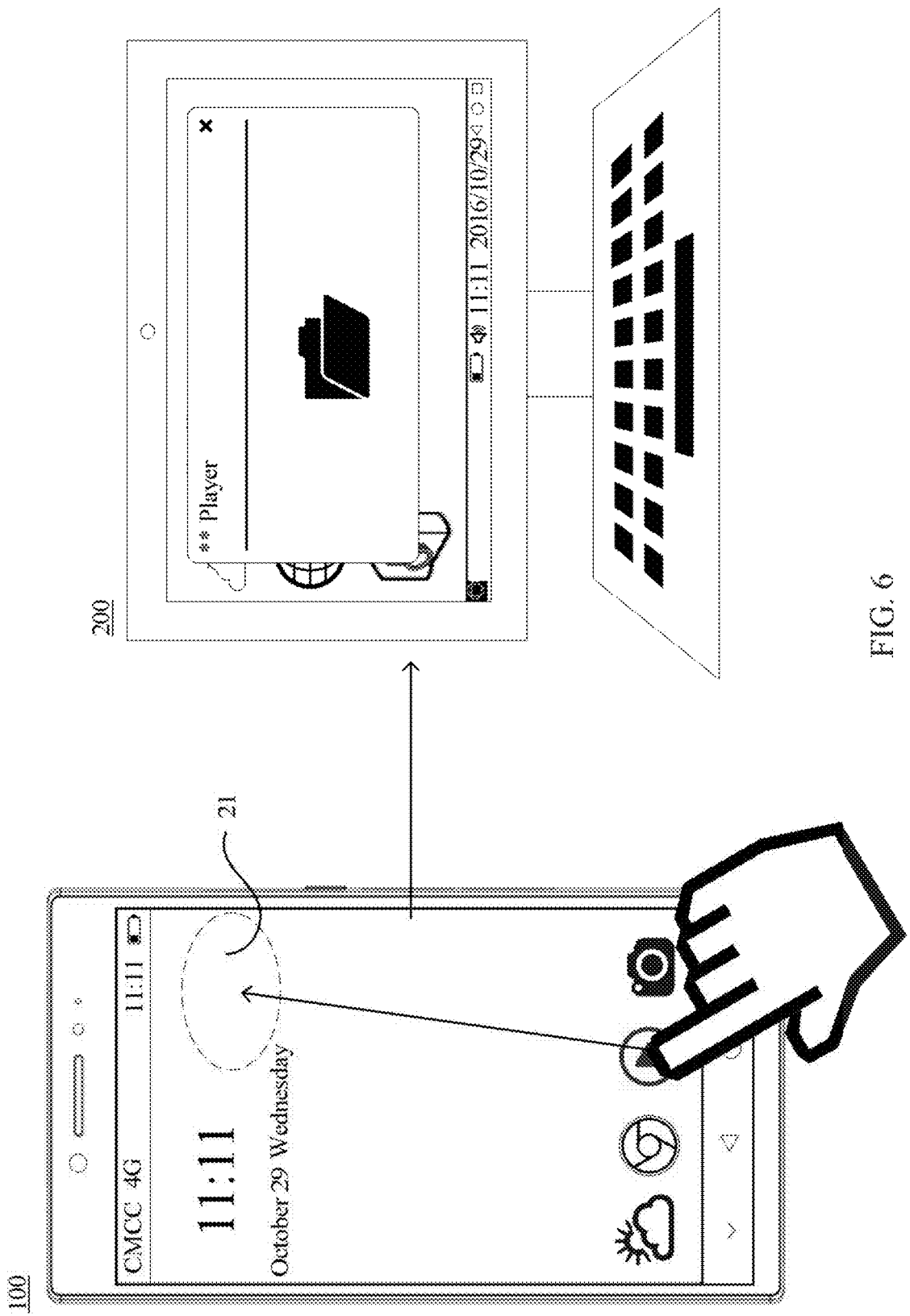
FIG. 6 is a schematic diagram 4 of an application scenario of a display method according to an embodiment of this application.

For example, as shown in FIG. 6, after the first terminal 100 connects to the second terminal 200, the first interface is a desktop of the first terminal 100, and the user triggers the first gesture for an icon (namely, the target shortcut) of a player application on the desktop of the first terminal 100, for example, drags the player application to a specified area 21. In this case, in response to the first gesture, the first terminal may send, to the second terminal 200, the first display data such as a display interface generated by the player application, and the second terminal 200 runs and displays the player application in a display interface (namely, the second display interface) of the second terminal 200. In this way, the user may control, on the first terminal 100 by using the first gesture, the application to switch between the first terminal 100 and the second terminal 200. This improves efficiency in switching the application between a plurality of screens when the terminal performs multi-screen display.

Figure 7:
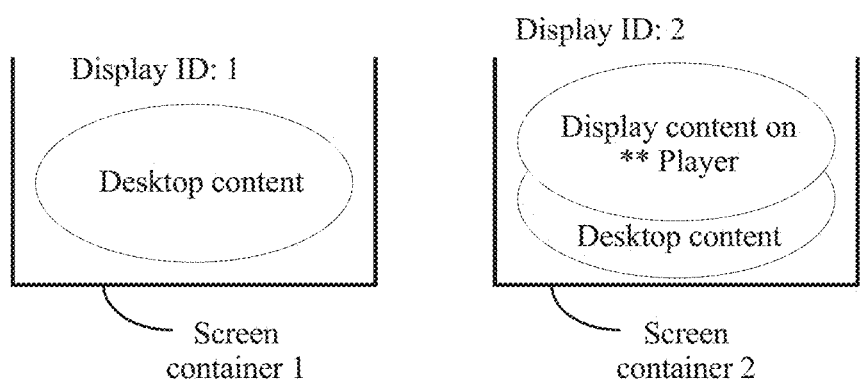
FIG. 7 is a schematic diagram 5 of an application scenario of a display method according to an embodiment of this application.

Specifically, with reference to a heterogenous display principle shown in FIG. 3A and FIG. 3B, as shown in FIG. 7, in the foregoing embodiment, after the first terminal 100 connects to the second terminal 200, the first terminal 100 stores, in a screen container 1 indicated by a display ID 1, desktop content that needs to be displayed on the first terminal 100 at this time, and the first terminal 100 stores, in a screen container 2 indicated by a display ID 2, desktop content that needs to be displayed on the second terminal 200 at this time and sends the desktop content to the second terminal 200. In this way, a display of the first terminal 100 presents the first display interface to the user based on the desktop content in the screen container 1, and a display of the second terminal 200 presents the second display interface to the user based on the desktop content in the screen container 2.

In this case, after the first terminal 100 detects the first gesture of dragging the icon of the player application to the specified area 21, still as shown in FIG. 7, the first terminal 100 may be triggered to generate, in the screen container 2, display content of the player application, and send the display content of the player application to the second terminal 200. In this way, the second terminal 200 connected to the first terminal 100 may switch, for running and displaying and by accessing the screen container 2, the player application that is triggered by the user on the first terminal 100 to the second display interface of the second terminal 200, so that an application that is not started is switched between the first terminal 100 and the second terminal 200.

When storing the generated display content of the player application in the screen container 2, the first terminal 100 may adjust the display content of the player application based on specification information such as a resolution and DPI of the display of the second terminal 200, so that the display content of the player application meets the specification information of the display of the second terminal 200.

For another example, a resolution of the first terminal 100 is A, and a resolution of the second terminal 200 is B. A common player application usually supports displays with a plurality of resolutions (for example, when the player application is launched in an application market, the player application supports a display with the resolution A and a display with the resolution B). Therefore, after the first terminal 100 detects the first gesture of dragging the player application to the specified area 21, the first terminal 100 may change a resolution parameter of the player application from A to B, and then stores, in the screen container 2, the display content generated by the player application, so that the user can watch, on the display of the second terminal 200, the display content that matches the resolution of the display of the second terminal 200, thereby improving user experience.

Figure 8A:
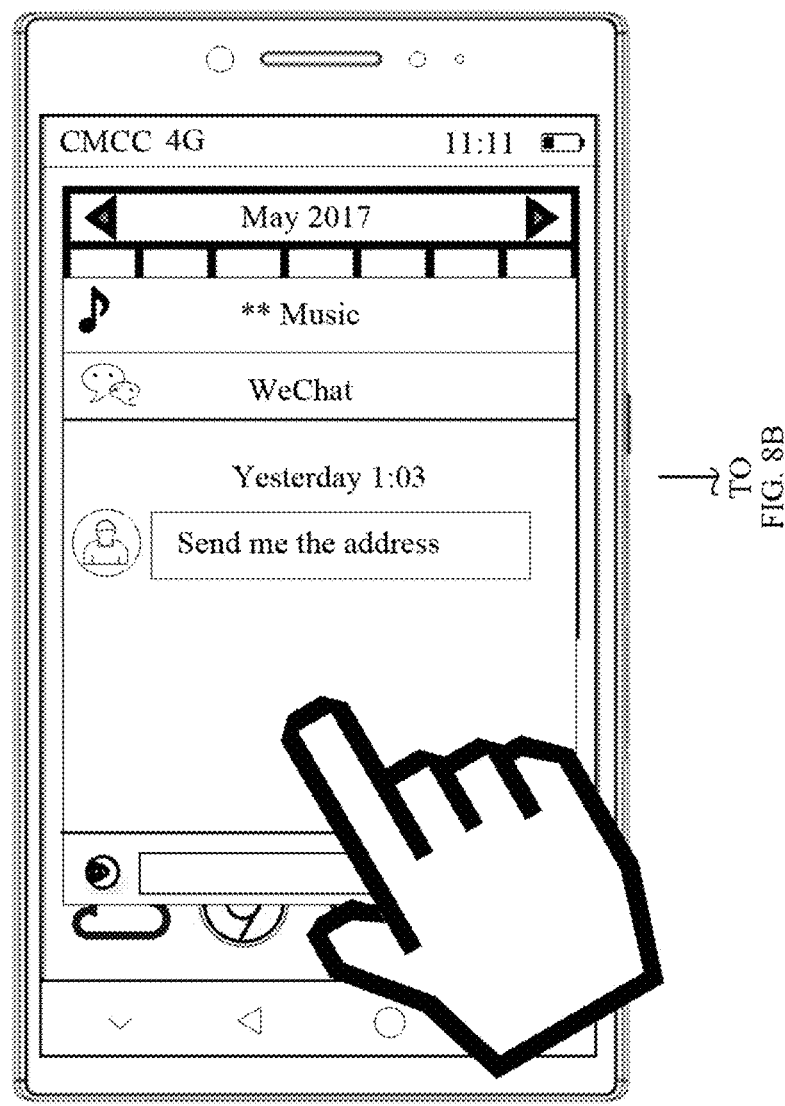
FIG. 8A and FIG. 8B are a schematic diagram 6 of an application scenario of a display method according to an embodiment of this application.
Figure 8B:
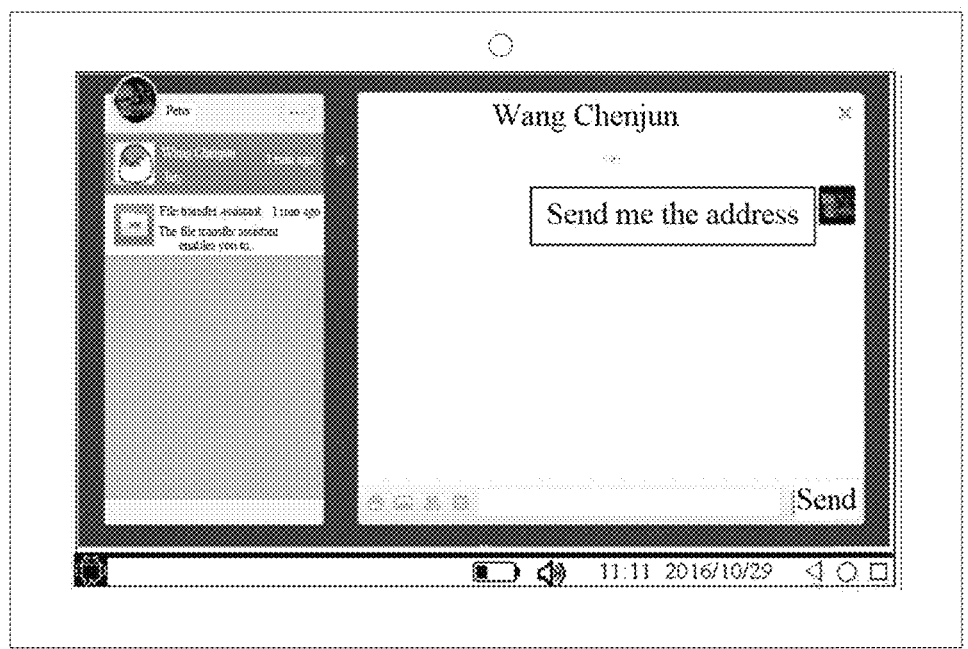

Alternatively, after the first terminal 100 connects to the second terminal 200, the first terminal 100 may be running a plurality of applications. For example, as shown in FIG. 8A and FIG. 8B, the first terminal 100 is running a calendar application, a music application, and a WeChat application. If the user makes the first gesture in a window of the WeChat application (namely, the target shortcut) in a multitask window, for example, makes a double-tap in the window of the WeChat application, the first terminal 100 may be triggered to send, to the second terminal 200, the first display data such as a display interface currently generated by the WeChat application, so that the second terminal 200 displays the display interface of the WeChat application in the second display interface. In this way, the user may control, on the first terminal 100 by using the first gesture, the application running in the background to switch between the first terminal 100 and the second terminal 200. This improves efficiency in switching the application between a plurality of screens when the terminal performs multi-screen display.

Figure 9:
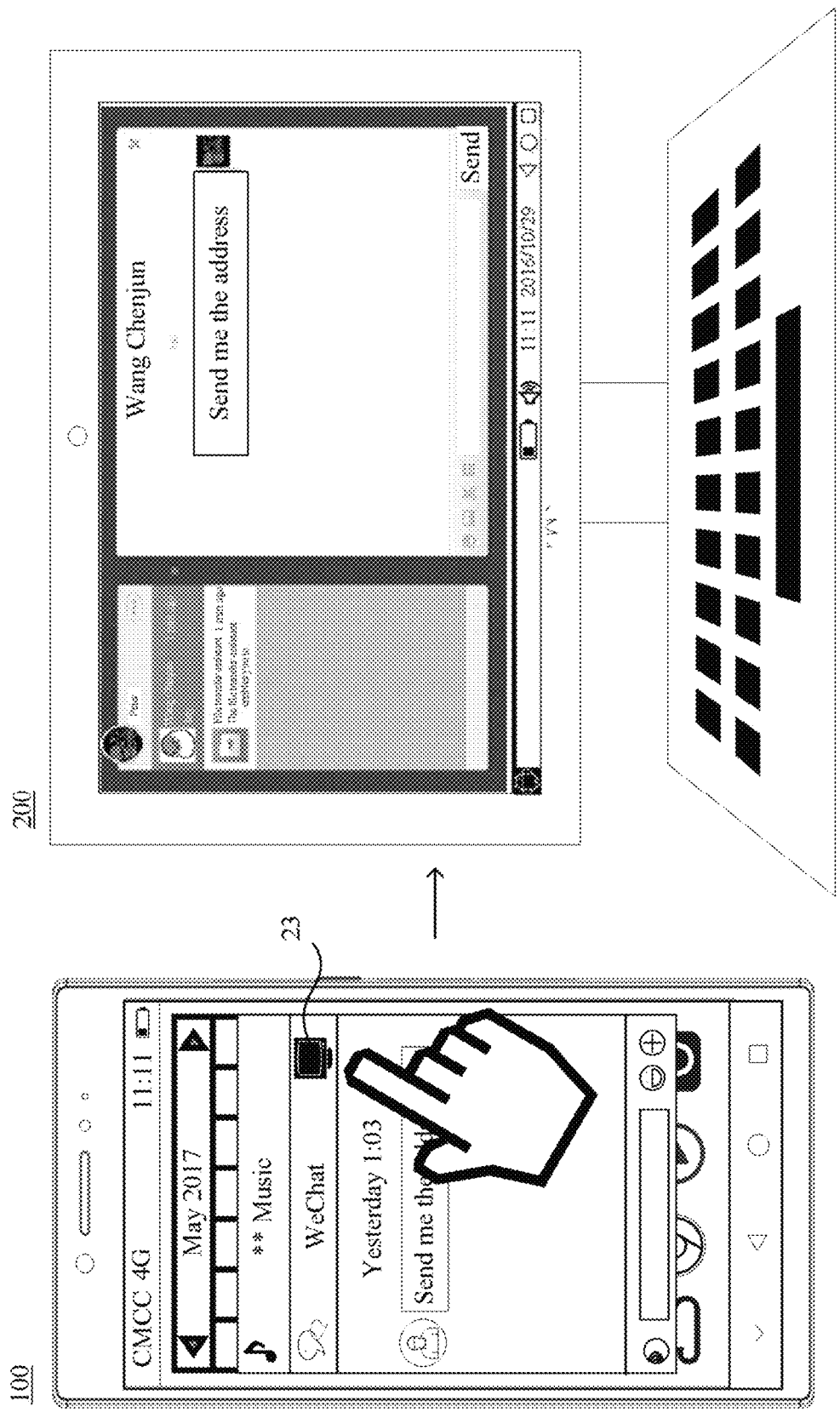
FIG. 9 (*a*) and FIG. 9 (*b*) are a schematic diagram 7 of an application scenario of a display method according to an embodiment of this application.
Figure 9:
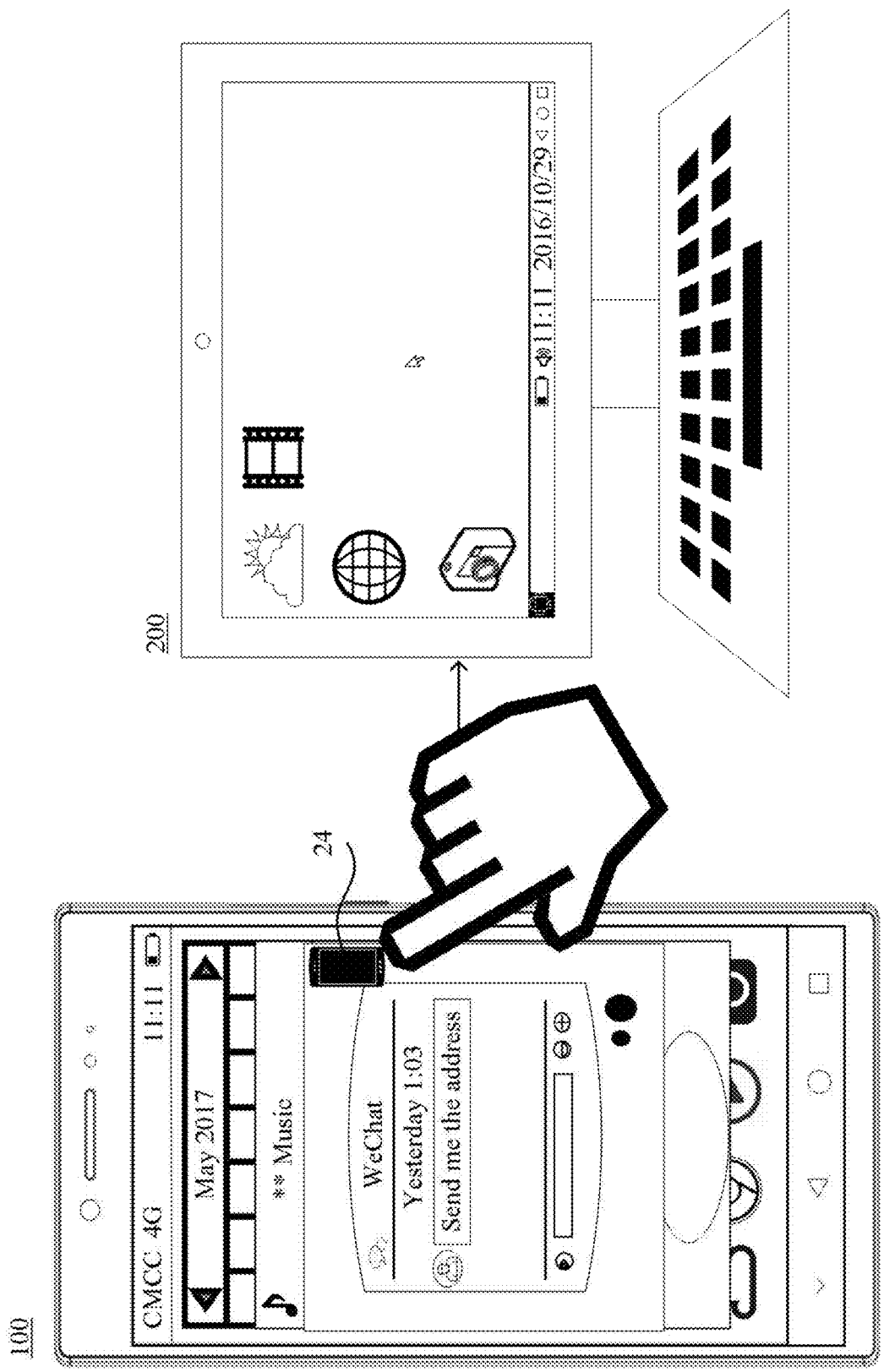

Alternatively, a shortcut button used for switching an application between the first terminal 100 and the second terminal 200 to display the application may be additionally configured in a multitask window of the first terminal 100. As shown in FIG. 9 (*a*), the multitask window of the first terminal 100 includes the window of the WeChat application, and a first shortcut button 23 may be configured in the window of the WeChat application. After the first terminal 100 connects to the second terminal 200, the first shortcut button 23 may be prominently displayed (for example, the first shortcut button 23 is highlighted). When detecting that the user taps the first shortcut button 23, the first terminal 100 is triggered to send, to the second terminal 200, a display interface that is currently generated by the WeChat application, so that the second terminal 200 displays the display interface of the WeChat application in the second display interface.

In this case, the window of the WeChat application that is originally displayed on the first terminal 100 may be changed correspondingly. For example, as shown in FIG. 9 (*b*), after the WeChat application is switched to the display interface of the second terminal 20X), the window of the WeChat application on the first terminal 100 may be correspondingly displayed on a large-screen display, or the window of the WeChat application on the first terminal 100 may be marked by another color to remind the user that the WeChat application is currently displayed on the second terminal 200.

In addition, as shown in FIG. 9 (*b*), after the WeChat application is switched to the second terminal 200 for displaying, a second shortcut button 24 may be displayed in the window of the WeChat application. When detecting that the user taps the second shortcut button 24, the first terminal 100 is triggered to switch the WeChat application displayed in the second display interface back to the first display interface, and stop sending, to the second terminal 200, the display interface that is currently generated by the WeChat application. In this case, the second terminal 200 resumes a display state (for example, a desktop state) that exists before the WeChat application is displayed.

Certainly, the user may manually configure which application can be switched to the second terminal 200 for displaying and which application is not allowed to be switched to the second terminal 200 for displaying, and the first terminal 100 may display the foregoing shortcut button on only an interface of an application that is allowed to be switched to the second terminal 200 for displaying. This is not limited in this embodiment of this application.

Figure 10:
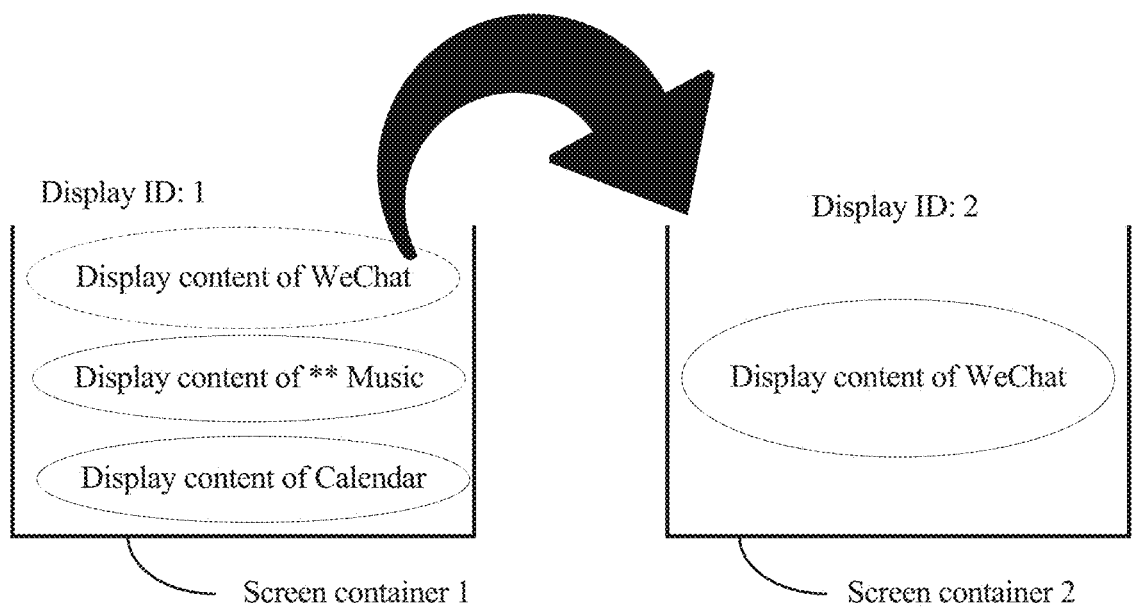
FIG. 10 is a schematic diagram 8 of an application scenario of a display method according to an embodiment of this application.

Specifically, with reference to the heterogenous display principle shown in FIG. 3A and FIG. 3B, as shown in FIG. 10, in the foregoing embodiment, display content of the calendar application, the music application, and the WeChat application that are running on the first terminal 100 is stored in the screen container 1 indicated by the display ID 1. The display of the first terminal 100 presents a multitask window for the calendar application, the music application, and the WeChat application to the user based on the display content of the applications that is in the screen container 1. In this case, when the first terminal 100 detects the first gesture of double-tapping the window of the WeChat application (or tapping the first shortcut button 23), the first terminal 100 is triggered to store, in the screen container 2, the display content (namely, the first display data) that is of the WeChat application and that is in the screen container 1. In this way, the second terminal 200 connected to the first terminal 100 may switch, by accessing the screen container 2, the window of the WeChat application running on the first terminal 100 to the second display interface of the second terminal 200, to continue to run and to be displayed. In this way, the display content that is of the WeChat application and that is in the screen container 2 and the display content that is of the WeChat application and that is in the screen container 1 may be seamlessly connected. In other words, a running application is seamlessly switched between the first terminal 100 and the second terminal 200, and the user does not need to restart the WeChat application on the second terminal 200. This greatly improves user experience when the terminal displays different applications on a plurality of screens.

Similarly, when storing, in the screen container 2, the display content that is of the WeChat application and that is in the screen container 1, the first terminal 100 may adjust the display content of the WeChat application based on specification information such as a resolution and DPI of the display of the second terminal 200, so that the display content of the WeChat application meets the specification information of the display of the second terminal 200.

Certainly, if the foregoing target application is a video type application, the first terminal 100 may switch, to the screen container 2 for storage, display content that is of the video and that is currently played in the screen container 1, so that video playback progress displayed on the first terminal 100 before the switching is the same as video playback progress displayed on the second terminal 200 after the switching. Alternatively, when the foregoing target application is a game type application, the first terminal 100 may switch, to the screen container 2 for storage, current display content that is of the game and that is in the screen container 1, so that a game system interface displayed on the first terminal 100 before the switching is the same as a game system interface displayed on the second terminal 200 after the switching. In this way, when the target application is switched between the first display interface and the second display interface, the target application can seamlessly continue without a need to restart a process of the target application.

Figure 11:
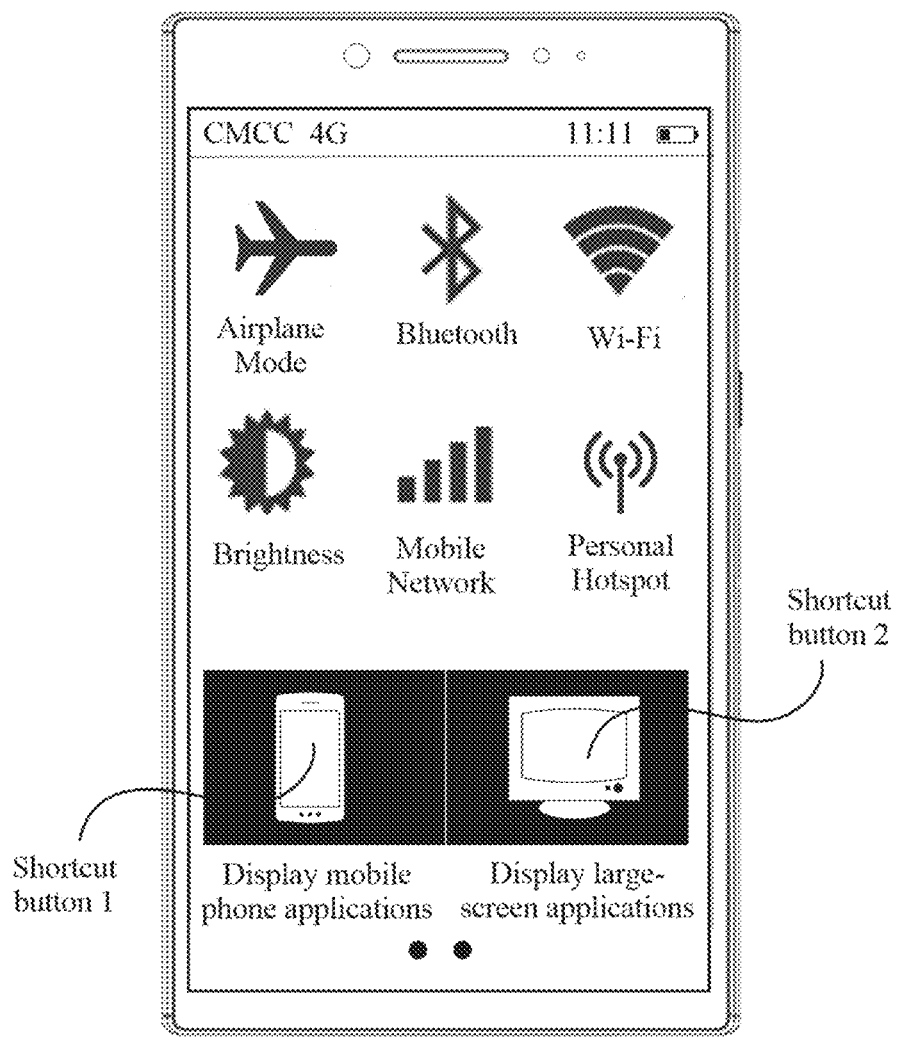
FIG. 11 (*a*) and FIG. 11 (*b*) are a schematic diagram 9 of an application scenario of a display method according to an embodiment of this application.
Figure 11:
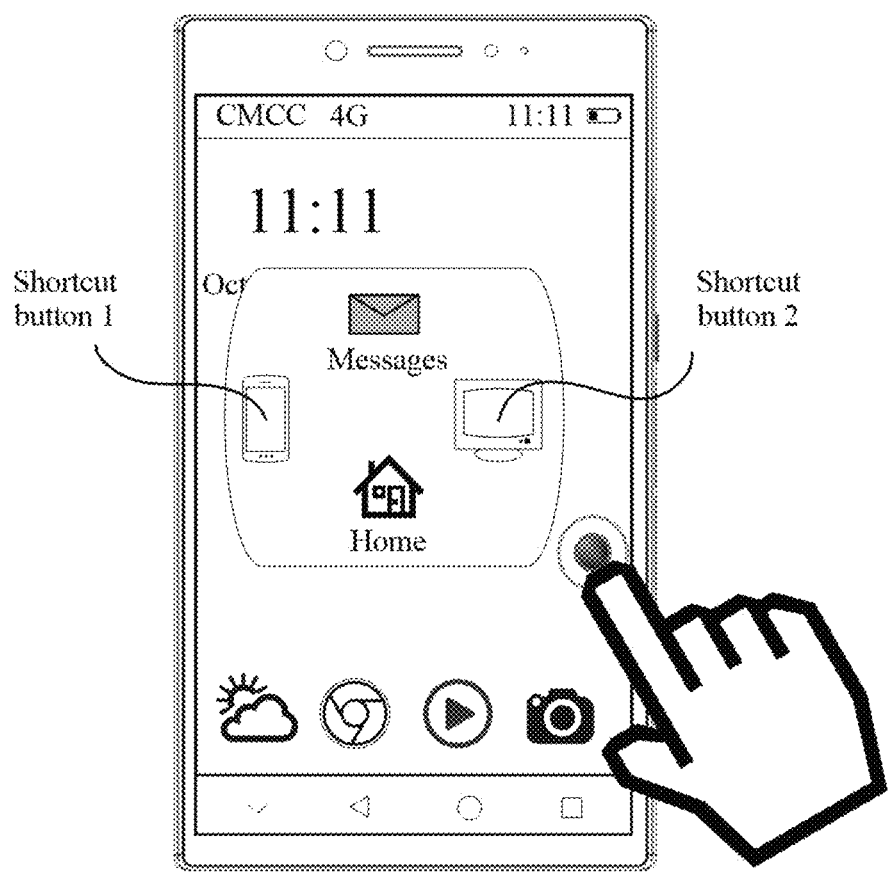

Alternatively, shortcut buttons configured on the first terminal 100 may be a shortcut button 1 and a shortcut button 2 in a drop-down list shown in FIG. 11 (*a*), or may be a shortcut button 1 and a shortcut button 2 that are displayed as triggered by a floating button shown in FIG. 11 (*b*). The shortcut button 1 corresponds to an application running in the first display interface of the first terminal 100, and the shortcut button 2 corresponds to an application running in the second display interface of the second terminal 200. In this case, when detecting that the user taps the shortcut button 2, the first terminal 100 presents, in a form of a multitask window in the first display interface, one or more applications that run in the second display interface at this time. When detecting that the user taps the shortcut button 1, the first terminal 100 presents, in a form of a multitask window in the first display interface, one or more applications that currently run in the first display interface. This can help the user manage the applications in the two display interfaces.

Figure 12:
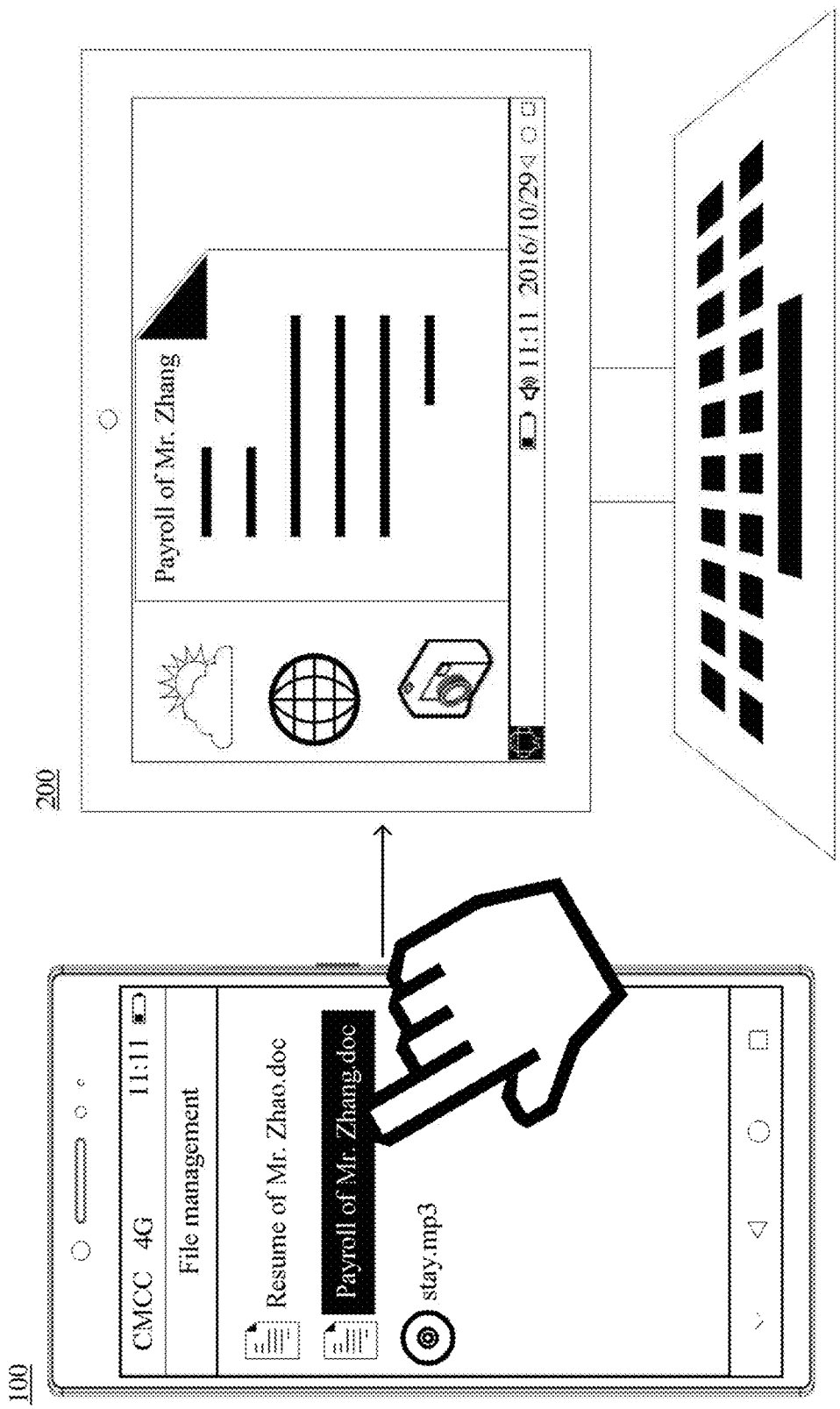
FIG. 12 is a schematic diagram 10 of an application scenario of a display method according to an embodiment of this application.

Alternatively, as shown in FIG. 12, after the first terminal 100 connects to the second terminal 200, the first terminal 100 is running a file management application. In other words, the current first display interface is a display interface of the file management application. If the user makes the first gesture, for example, sliding to the right, on a selected Word file "Payroll of Mr. Zhang" (namely, the target shortcut) in the first display interface, the first terminal 100 may be triggered to send the Word file "Payroll of Mr. Zhang" to the second terminal 200, and the second terminal 200 runs and displays the file in the second display interface. In this way, the user may control, on the first terminal 100 by using the first gesture, the target content to switch between the first terminal 100 and the second terminal 200. This improves efficiency in switching the application between a plurality of screens when the terminal performs multi-screen display.

Figure 13:
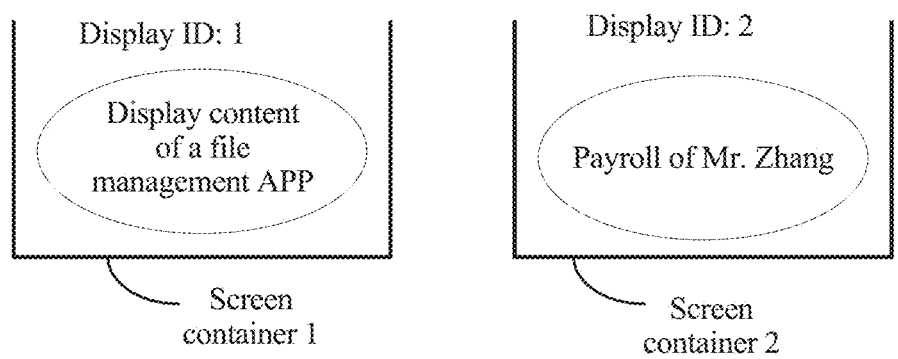
FIG. 13 is a schematic diagram 11 of an application scenario of a display method according to an embodiment of this application.

Specifically, with reference to the heterogenous display principle shown in FIG. 3A and FIG. 3B, as shown in FIG. 13, in the foregoing embodiment, display content of the file management application running on the first terminal 100 is stored in the screen container 1 indicated by the display ID 1. In this case, the display of the first terminal 100 presents a display interface (namely, the first display interface) of the file management application to the user based on the display content in the screen container 1. In this case, when the first terminal 100 detects that the user slides the Word file "Payroll of Mr. Zhang" to the right, the first terminal 100 is triggered to store the Word file "Payroll of Mr. Zhao" in the screen container 2. In this way, the second terminal 200 connected to the first terminal 100 may run and display, by accessing the screen container 2, the Word file "Payroll of Mr. Zhang" in the second display interface of the second terminal 200, so that the target file is switched between the first terminal 100 and the second terminal 200.

In another possible design manner, after detecting the first gesture triggered by the user in the first display interface, the first terminal may determine, based on current scenario description data, whether to display, in the second display interface of the second terminal, display data correlated to the target content. In other words, the first terminal may determine, based on a specific current application scenario, whether to switch an application between the first terminal and the second terminal, so that the user can gain optimal application experience.

The scenario description data may be used to indicate a specific application scenario in which the user triggers the first gesture. For example, when a player application is the target content, the scenario description data may be specifically a device running status of the first terminal after the first gesture is detected.

Figure 14:
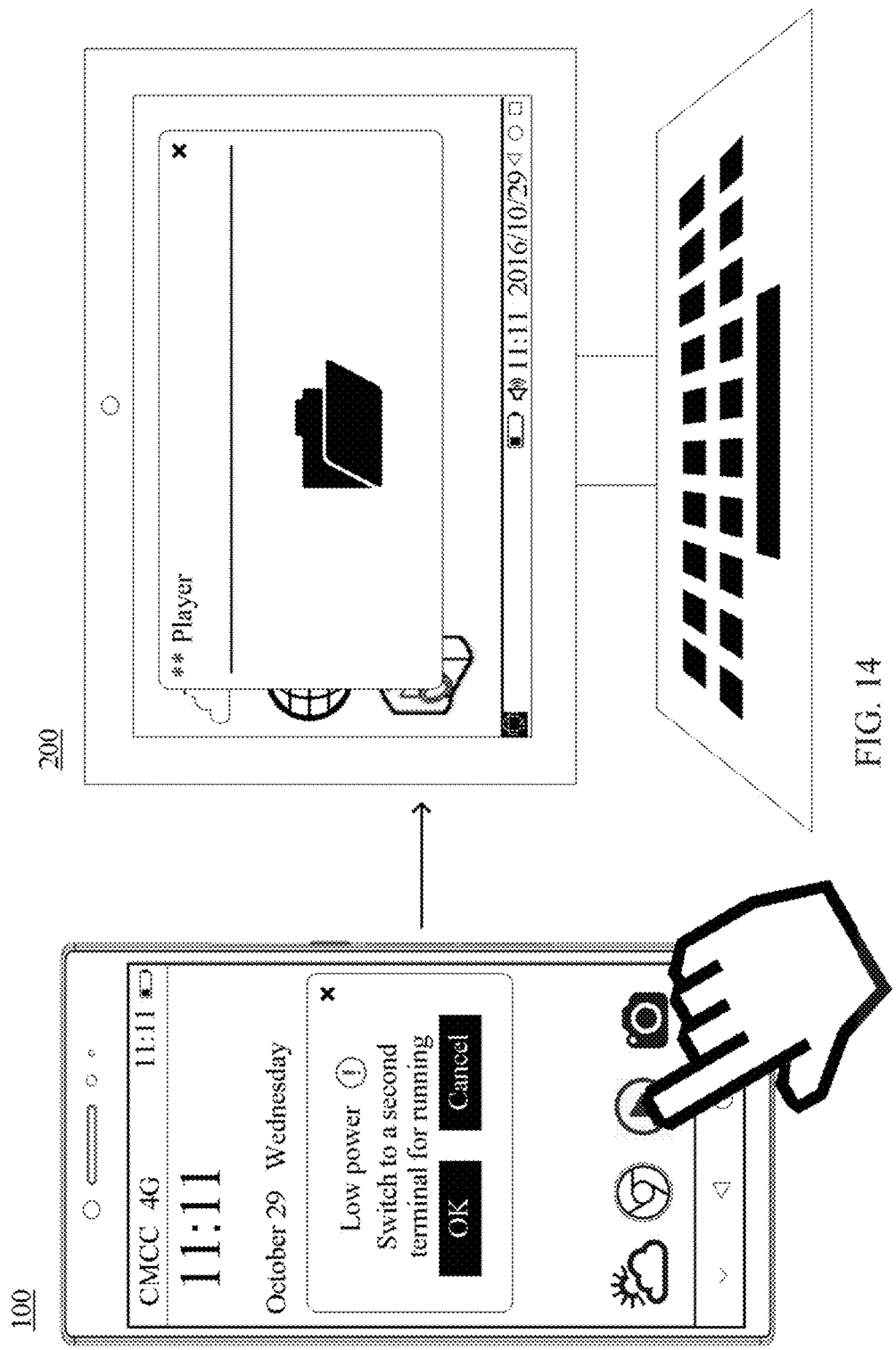
FIG. 14 is a schematic diagram 12 of an application scenario of a display method according to an embodiment of this application.

In this case, as shown in FIG. 14, after the first terminal 100 connects to the second terminal 200, the user triggers the first gesture, for example, a tap operation, on an icon of a player application in the first display interface of the first terminal 100. After the first terminal 100 detects the first gesture triggered on the icon of the player application, the first terminal 100) is triggered to obtain a current device running status of the first terminal 100, for example, at least one of a battery level, network quality, a memory size, CPU usage, and the like of the first terminal 100. Then the first terminal 100 may determine, based on the device running status, whether the current first terminal 100 supports running of the player application.

For example, if a current battery level of the first terminal 100 is less than a preset threshold, it can be determined that the current device running status of the first terminal 100 does not support running and displaying of the player application in the first display interface. In this case, as shown in FIG. 14, a prompt box may be used on the first terminal 100 to prompt the user to switch the player application to the second terminal 200 for running. If the user determines to switch the player application to the second terminal 200 for running, the first terminal 100 is triggered to store, in the screen container 2, a display interface (namely, the first display data) generated by the player application, and send the display interface to the second terminal 200. The second terminal 200 displays the display interface based on the display interface that is of the player application and that is in the screen container 2, so that the user can gain more intelligent application experience.

504. (Optional) The first terminal obtains a second gesture triggered by the user in the first display interface.

505. (Optional) In response to the second gesture, the first terminal stops sending the first display data to the second terminal, and displays, in the first display interface, third display data correlated with the first display data.

In steps 504 and 505, after the first terminal sends the first display data to the second terminal for displaying, the first terminal may further convert, by using the second gesture made by the user, the first display data in the second display interface into the third display data that matches a display specification of the first terminal, and display the third display data in the first display interface, so that the target application is switched back to the first display interface of the first terminal. In this way, the user may freely switch the target application between the first terminal and the second terminal simply by operating the first terminal.

Figure 15:
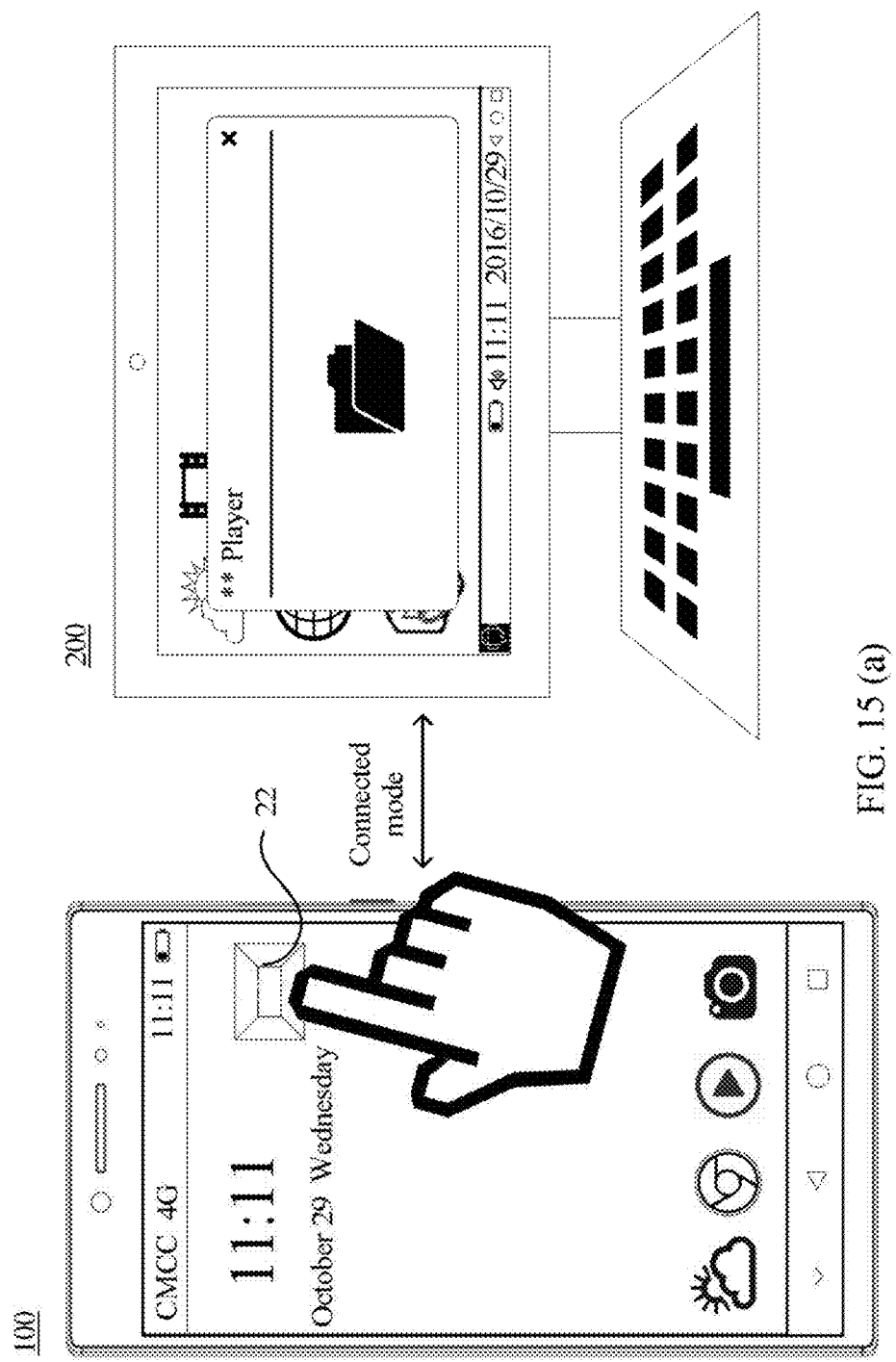
FIG. 15 (*a*) and FIG. 15 (*b*) are a schematic diagram 13 of an application scenario of a display method according to an embodiment of this application.
Figure 15:
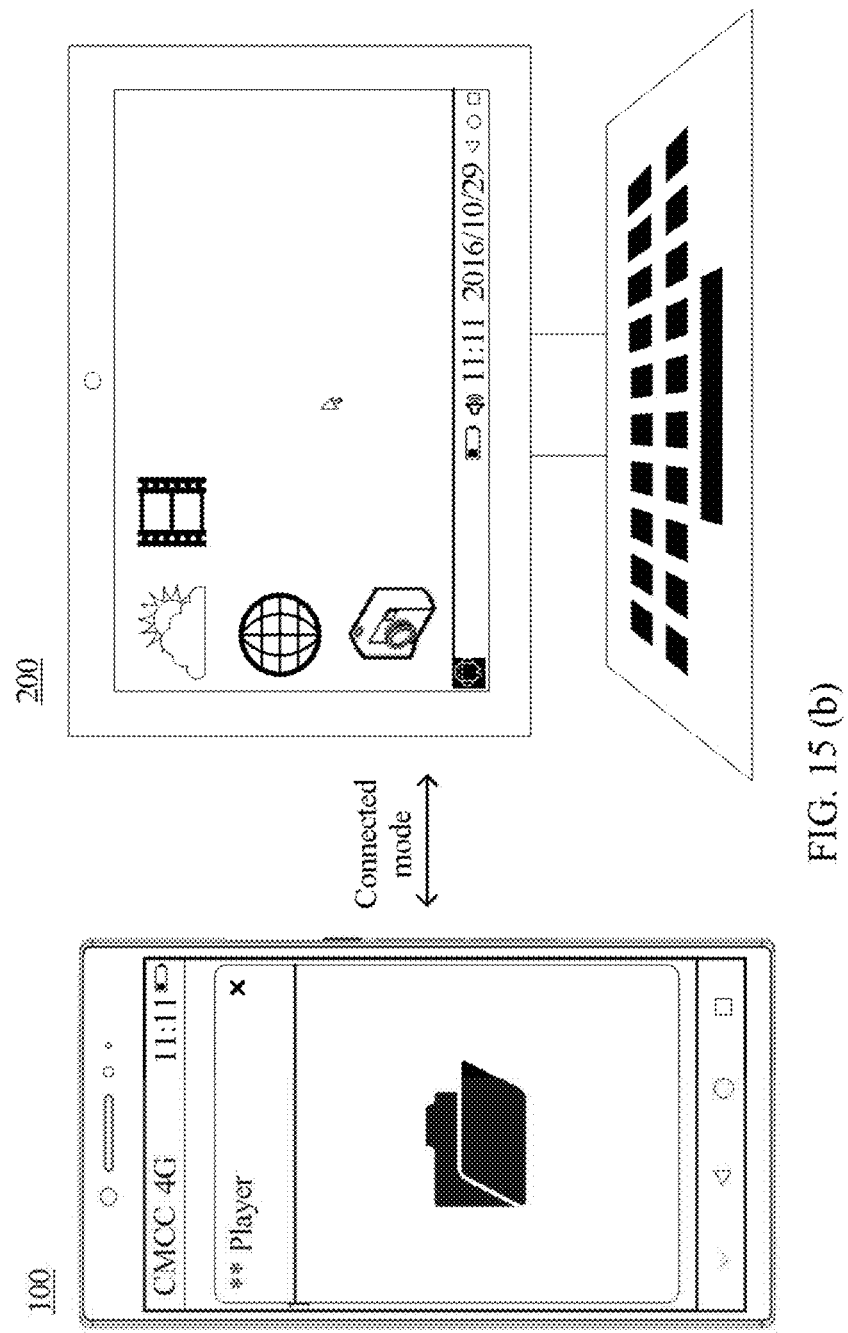

For example, after the first terminal 100 connects to the second terminal 200, in response to the first gesture, the first terminal 100 switches a player application to the second display interface of the second terminal 200 for running and displaying. In this case, as shown in FIG. 15 (*a*), if the first terminal 100 detects that the user taps a switching button 22 in the first display interface, as shown in FIG. 15 (*b*), the first terminal 100 may be triggered to stop sending the display data in the screen container 2 to the second terminal 200. In addition, the first terminal 100 may convert display content that is of the player application and that is in the screen container 2 into display content (namely, the third display data) that matches specification information of the display of the first terminal 100, and move the display content to the screen container 1. In this way, the display of the first terminal 100 may switch, simply by reading the display content of the player application from the screen container 1, the player application back to the first display interface for displaying.

In this way, the display content that is of the player application and that is in the screen container 1 and the display content that is of the player application and that is in the screen container 2 may be seamlessly connected. In other words, an application, a document photo, or the like may be seamlessly and freely switched between the first terminal 100 and the second terminal 200. This improves efficiency in switching an application between a plurality of screens.

Certainly, in addition to tapping the switching button 22, the second gesture may be a floating touch gesture, a two-finger sliding gesture, a press gesture, or the like. This is not limited in this embodiment of this application.

In addition, when the first terminal 100 detects the second gesture triggered in the first display interface, if a plurality of applications run in the second display interface of the second terminal 200, the first terminal 100 may selectively switch one or more of the plurality of applications back to the first display interface.

For example, because an application that is being operated by the user usually runs in the foreground, the first terminal 100 may switch only an application running in the foreground in the second display interface back to the first display interface. Alternatively, the first terminal 100 may switch all applications running in the second display interface back to the first display interface. This is not limited in this embodiment of this application.

Figure 16:
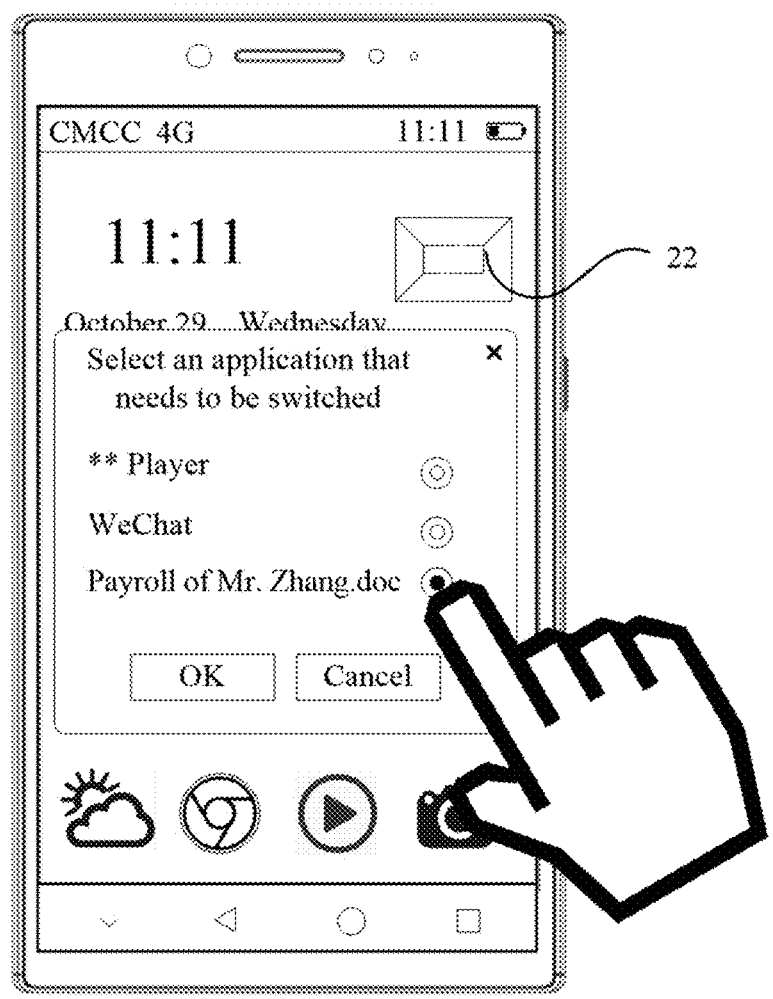
FIG. 16 is a schematic diagram 14 of an application scenario of a display method according to an embodiment of this application.

Further, as shown in FIG. 16, when a plurality of applications run in the second display interface of the second terminal 200, if the first terminal 100 detects that the user taps the switching button 22 in the first display interface, the first terminal 100 may be triggered to display a prompt box in the first display interface of the first terminal 100. The prompt box may include all the applications running in the second display interface. In this case, the user may manually select one or more applications that need to be switched back to the first display interface. This helps the user manage a process of switching an application between a plurality of screens.

Figure 17:
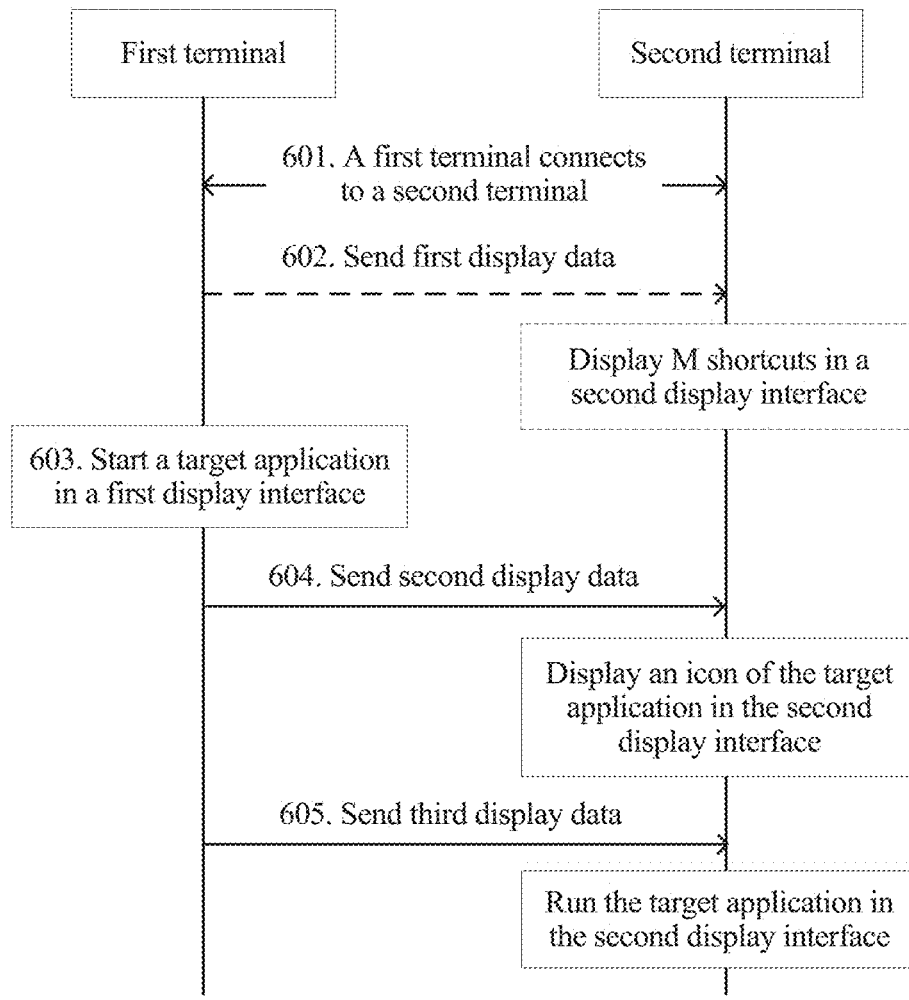
FIG. 17 is a schematic flowchart 2 of a display method according to an embodiment of this application.

In another possible design method, an embodiment of this application further provides a display method. As shown in FIG. 17, the method includes the following steps.

601. A first terminal connects to a second terminal, so that the first terminal and the second terminal can communicate with each other.

602. (Optional) The first terminal sends first display data to the second terminal, so that the second terminal displays M shortcuts in a second display interface, where the M shortcuts are shortcuts of applications that are installed on the first terminal and that have a same or similar attribute.

Specifically, after the first terminal connects to the second terminal, the first terminal may selectively select M (M≤N) applications from N applications installed on the first terminal, and send icons (namely, second display data) of the M applications to the second terminal, so that the second terminal displays, in the display interface of the second terminal, the M application icons that have a same or similar attribute, and a user can quickly find out a required target application from the second terminal.

Figure 18:
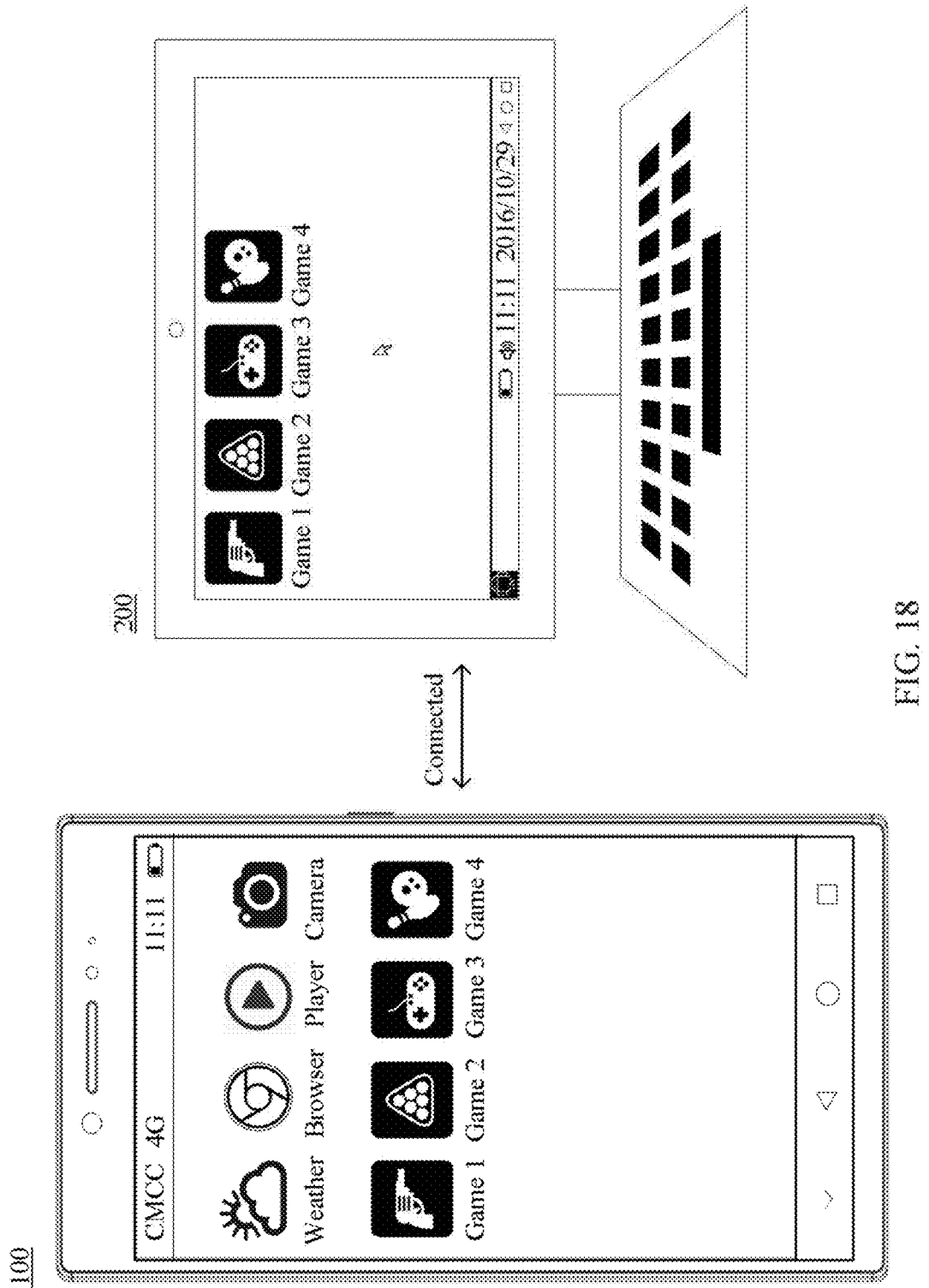
FIG. 18 is a schematic diagram 15 of an application scenario of a display method according to an embodiment of this application.

For example, as shown in FIG. 18, eight applications are installed on the first terminal 100, and four applications are game applications. In this case, when the user sets the first terminal 100 to a game mode, if the first terminal 100 connects to the second terminal 200, the first terminal may project icons of the four game applications onto the second display interface of the second terminal 200.

Alternatively, when detecting that the first terminal 100 connects to an office computer of a company, the first terminal 100 may project an application or data that is unrelated to user privacy onto the second display interface of the second terminal 200, to reduce a risk of leaking user privacy during screen sharing.

Specifically, the M applications may be a type of application on the first terminal, for example, an office type application (including office series applications), a game type application (including Angry Birds, Honor of Kings, and the like), a payment type application (including Alipay, Industrial and Commercial Bank of China, and the like). This type of application may be obtained through division based on a user setting, or may be obtained through division by the first terminal based on a classification standard in an application market. This is not limited in this embodiment of this application.

603. The first terminal starts a target application in a first display interface.

604. The first terminal sends, to the second terminal, second display data of an icon used to indicate the target application, so that the second terminal displays the icon of the target application in the second display interface.

In steps 603 and 604, when the first terminal starts to run a new application (namely, the target application) in the first display interface, the first terminal may send, to the second terminal for displaying, the second display data corresponding to the icon of the target application, so that the icon of the target application is synchronously displayed in the second display interface of the second terminal. In this way, an entry for quickly entering the target application may be provided for the user in the second display interface, to help the user to continue to perform a related function of the target application on the second terminal.

Figure 19:
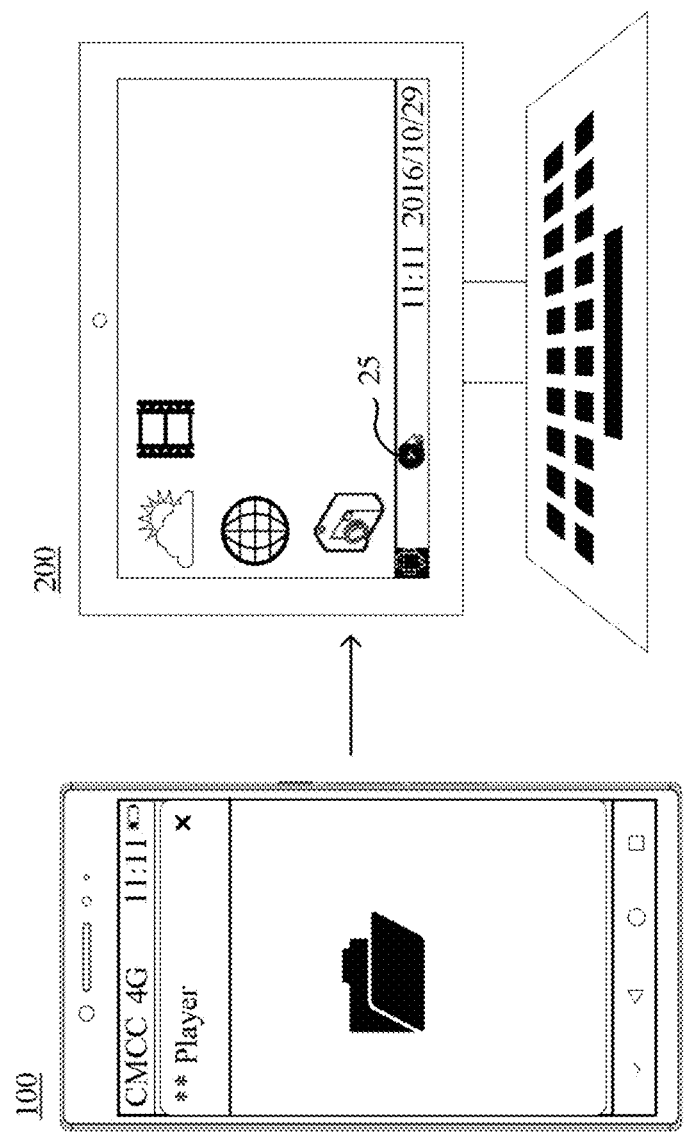
FIG. 19 is a schematic diagram 16 of an application scenario of a display method according to an embodiment of this application.

For example, as shown in FIG. 19, after the user taps an icon of a player on the first terminal 100, the first terminal 100 is triggered to start to run the player application. In this case, still as shown in FIG. 19, the first terminal 100 may display an icon 25 of the player application in a status bar in the second display interface, to notify the user that the first terminal 100 is running the player application. In this case, if the user needs to run the player application on the second terminal 200, the user may directly tap the icon 25 of the player application in the second display interface.

605. The first terminal sends third display data to the second terminal when detecting that a user triggers an icon of the target application in the second display interface, so that the second terminal runs the target application in the second display interface, where the third display data is used to indicate a display interface that is displayed when the target application is running.

Figure 20:
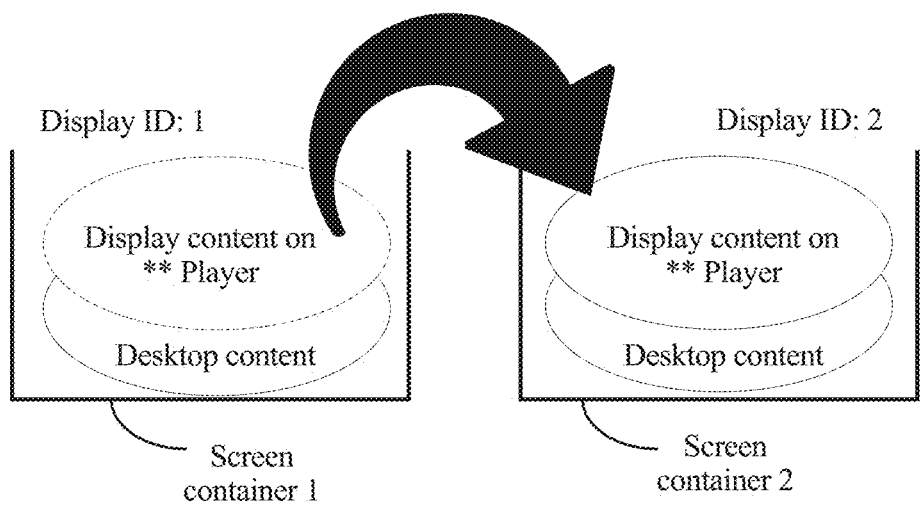
FIG. 20 is a schematic diagram 17 of an application scenario of a display method according to an embodiment of this application.

For example, when detecting that the user triggers the icon 25 of the player application in the second display interface, as shown in FIG. 20, the first terminal may store, in a screen container 2, display content that is of the player application and that is currently generated in a screen container 1, and send the display content that is of the player application and that is in the screen container 2 to the second terminal 200 for displaying.

Figure 21:
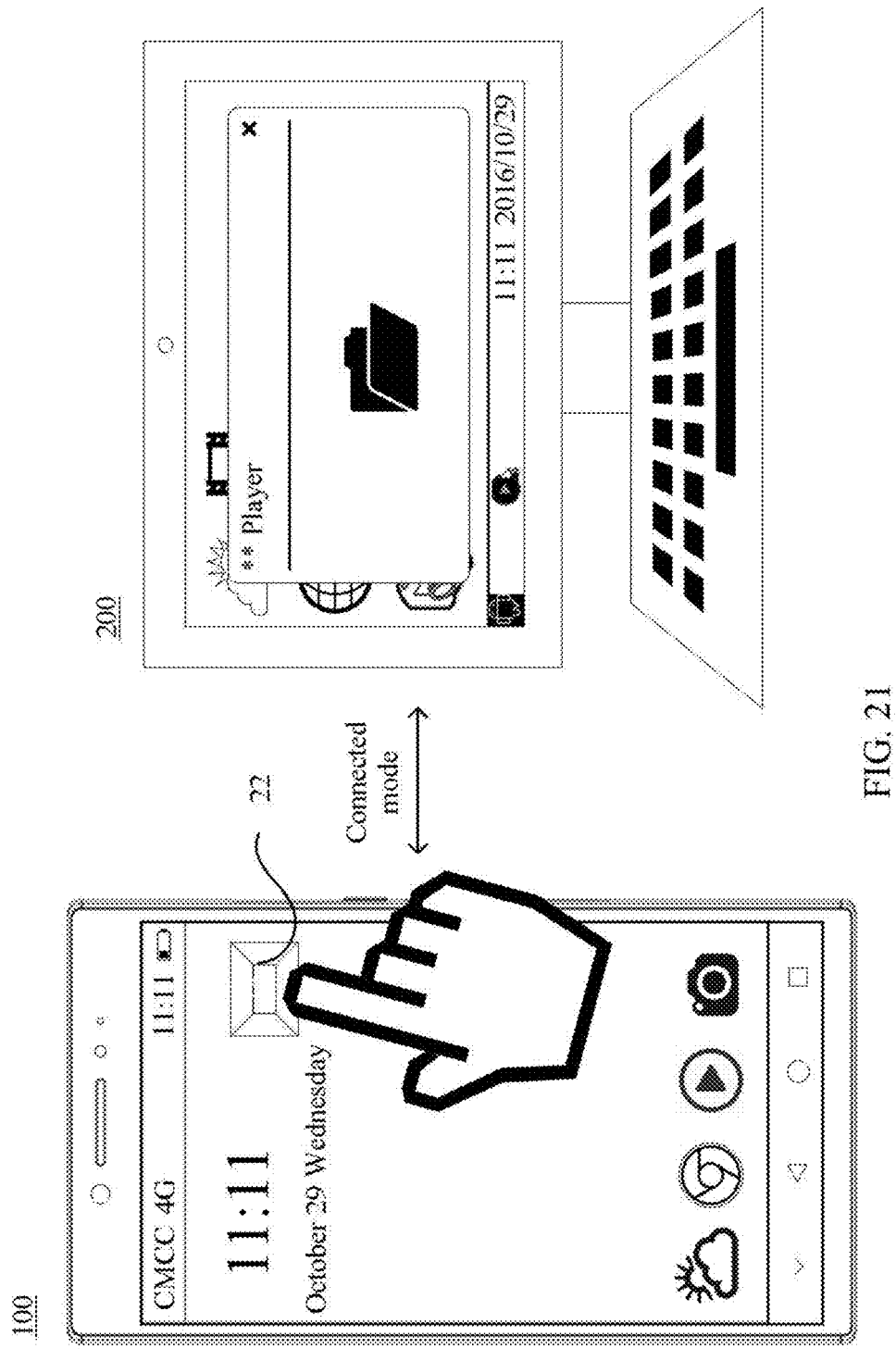
FIG. 21 is a schematic diagram 18 of an application scenario of a display method according to an embodiment of this application.

In this case, as shown in FIG. 21, the second terminal 200 connected to the first terminal 100 may continue to display the display content of the player application in the second display interface, so that the player application running on the first terminal 100 is switched to the second display interface of the second terminal 200, to continue to run and to be displayed. In addition, the first terminal 100 may stop displaying a related display interface of the player application, so that the first terminal 100 may further run another application. In this way, independent running is implemented in the first display interface and the second display interface.

In this case, as shown in FIG. 21, the switching button 22 may be further displayed in the display interface of the first terminal 100. When detecting that the user triggers the switching button 22, the first terminal 100 may stop sending the display content that is of the player application and that is in the screen container 2 to the second terminal 200. In addition, the first terminal 100 may convert the display content that is of the player application and that is in the screen container 2 into display content that matches specification information of a display of the first terminal 100, and move the display content to the screen container 1. In this way, as shown in FIG. 19, the display of the first terminal 100 may switch, simply by reading the display content of the player application from the screen container 1, the player application back to the first display interface for displaying. In this case, an interface element currently displayed in the first display interface of the first terminal 100 is the same as an interface element displayed, before the user triggers the switching button 22, in the second display interface of the second terminal 200.

In other words, the display content that is of the player application and that is in the screen container 1 and the display content that is of the player application and that is in the screen container 2 may be seamlessly connected. That is, the application is seamlessly and freely switched between the first terminal 100 and the second terminal 200, and the user does not need to restart the target application on the second terminal 200. This greatly improves user experience when the terminal performs multi-screen display.

It may be understood that to implement the foregoing functions, the foregoing terminal and the like includes a corresponding hardware structure and/or software module for performing each of the functions. A person of ordinary skill in the art should be easily aware that the units and algorithm steps in the examples described with reference to the embodiments disclosed in the embodiments of this application may be implemented by hardware or a combination of hardware and computer software in the embodiments of this application. Whether a function is performed by hardware or computer software driving hardware depends on a particular application and a design constraint condition of the technical solutions. A person skilled in the art may use different methods to implement the described functions for each particular application, but it should not be considered that the implementation goes beyond the scope of the embodiments of this application.

In the embodiments of this application, the terminal may be divided into function modules based on the foregoing method example. For example, each function module may be obtained through division based on each corresponding function, or two or more functions may be integrated into one processing module. The integrated module may be implemented in a form of hardware, or may be implemented in a form of a software function module. It should be noted that the module division in the embodiments of this application is an example, and is merely logical function division. There may be another division manner in an actual implementation.

Figure 22:
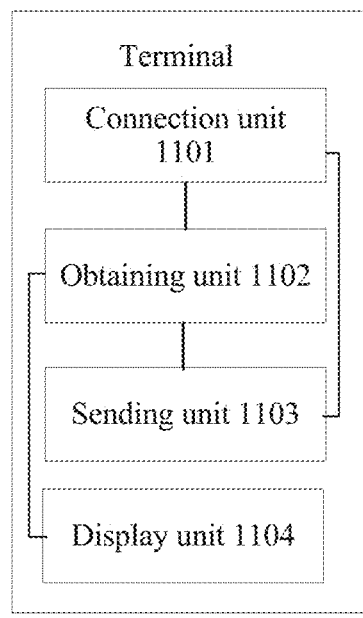
FIG. 22 is a schematic structural diagram 2 of a terminal according to an embodiment of this application.

When each function module is obtained through division based on a corresponding function, FIG. 22 is a possible schematic structural diagram of a terminal (for example, the first terminal or the second terminal) in the foregoing embodiment. The terminal includes a connection unit 1101, an obtaining unit 1102, a sending unit 1103, and a display unit 1104.

The connection unit 1101 is configured to support the terminal in performing the process 501 in FIG. 5 and the process 601 in FIG. 17. The obtaining unit 1102 is configured to support the terminal in performing processes 502 and 504 in FIG. 5. The sending unit 1103 is configured to support the terminal in performing the process 503 in FIG. 5 and processes 602, 604, and 605 in FIG. 17. The display unit 1105 is configured to support the terminal in performing the process 505 in FIG. 5 and the process 603 in FIG. 17. All related content of each step in the foregoing method embodiments may be cited in function descriptions of a corresponding function module in content of the present invention. Details are not described herein again.

Figure 23:
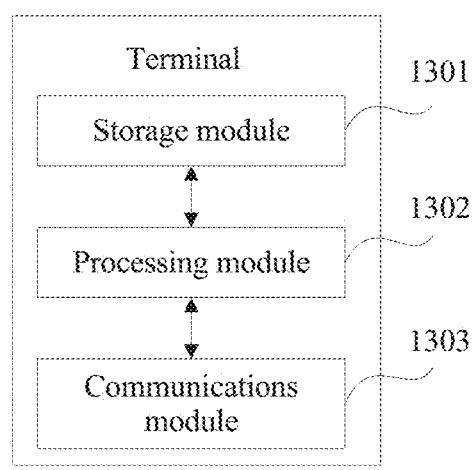
FIG. 23 is a schematic structural diagram 3 of a terminal according to an embodiment of this application.

When an integrated unit is used, FIG. 23 is a possible schematic structural diagram of a terminal (for example, the first terminal or the second terminal) in the foregoing embodiment. The terminal includes a processing module 1302 and a communications module 1303. The processing module 1302 is configured to control and manage an action of the terminal. The communications module 1303 is configured to support communication between the terminal and another network entity. The terminal may further include a storage module 1301 that is configured to store program code and data of the terminal.

The processing module 1302 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 1302 may implement or execute various examples of logical blocks, modules, and circuits that are described with reference to the content disclosed in this application. The processor may also be a combination implementing a computing function, for example, a combination including one or more microprocessors or a combination of a DSP and a microprocessor. The communications module 1303 may be a transceiver, a transceiver circuit, a communications interface, or the like. The storage module 1301 may be a memory.

When the processing module 1302 is a processor, the communications module 1303 is an RF transceiver circuit, and the storage module 1301 is a memory, the terminal provided in this embodiment of this application may be the mobile phone 100 shown in FIG. 4.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, that integrates one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display method implemented by a first terminal, the display method comprising:
presenting a first display interface comprising a plurality of shortcuts on a display screen of the first terminal, wherein the plurality of shortcuts corresponds to a set of applications installed on the first terminal;
establishing a coupling to a second terminal;
receiving an indication of a mode of the first terminal, wherein the mode corresponds to a portion of the set of applications;
continuing to present the first display interface comprising the plurality of shortcuts on the display screen of the first terminal and sending first display data to the second terminal to display M shortcuts in a second display interface of the second terminal, wherein the M shortcuts correspond to the portion of the set of applications, wherein M>zero, and wherein the first display data indicates the M shortcuts;
detecting that a user triggers a second shortcut in the second display interface, wherein the second shortcut is one of the M shortcuts; and
sending second display data to the second terminal to display a second interface of a second application corresponding to the second shortcut in the second display interface, wherein the second display data indicates the second interface that is displayed when the second application is running, and wherein the first display interface is different from the second display interface when the second display interface comprises the second interface.

2. The display method of claim 1, further comprising:
identifying that a first shortcut is displayed in the first display interface;
obtaining a first gesture from the user on the first shortcut; and
sending third display data to the second terminal in response to the first gesture to enable the second terminal to display the third display data in the second display interface, wherein the third display data is correlated with content corresponding to the first shortcut.

3. The display method of claim 2, wherein the first shortcut is in a multitask window displayed in the first display interface, wherein the multitask window comprises at least one shortcut of the applications, and wherein the third display data comprises a first interface of an application corresponding to the first shortcut.

4. The display method of claim 3, further comprising obtaining a tapping gesture on a first shortcut button on the first shortcut in the multitask window.

5. The display method of claim 4, wherein after obtaining the first gesture, the display method further comprises:
obtaining a device running status of the first terminal, wherein the device running status comprises at least one of a battery level, network quality, a memory size, or central processing unit (CPU) usage of the first terminal;
identifying that the device running status does not support displaying of the first interface in the first display interface; and
sending the third display data to the second terminal.

6. The display method of claim 1, further comprising:
identifying that a third application is running in a foreground of the first terminal;
obtaining a third gesture on a third interface of the third application displayed in the first display interface;
sending fourth display data to the second terminal in response to the third gesture to enable the second terminal to display the fourth display data in the second display interface, wherein the fourth display data is correlated with the third application; and
ceasing to display the third interface in the first display interface.

7. The display method of claim 6, wherein the fourth display data indicates a display interface displayed when the third application is running.

8. The display method of claim 7, wherein video playback progress displayed in the first display interface is the same as video playback progress displayed in the second display interface when the third application is a video type application, wherein a chat record in a chat window in the first display interface is the same as a chat record in a chat window in the second display interface when the third application is an instant messaging type application, and wherein a game system interface displayed in the first display interface is the same as a game system interface displayed in the second display interface when the third application is a game type application.

9. The display method of claim 1, wherein before sending the first display data to the second terminal, the display method further comprises:
running the second application on the first terminal;
displaying a fourth interface of the second application in the first display interface; and
ceasing to display the fourth interface in the first display interface after sending the first display data to the second terminal.

10. The display method of claim 9, wherein video playback progress displayed in the first display interface is the same as video playback progress displayed in the second display interface when the second application is a video type application, wherein a chat record in a chat window in the first display interface is the same as a chat record in a chat window in the second display interface when the second application is an instant messaging type application, and wherein a game system interface displayed in the first display interface is the same as a game system interface displayed in the second display interface when the second application is a game type application.

11. A terminal, comprising:
a display;
a communications interface coupled to the display and configured to couple to a second terminal; and
a processor coupled to the display and the communications interface and configured to:
present a first display interface comprising a plurality of shortcuts on the display of the terminal, wherein the plurality of shortcuts corresponds to a set of applications installed on the terminal;
control the communication interface to couple the terminal to the second terminal;
receive an indication of a mode of the terminal, wherein the mode corresponds to a portion of the set of applications;
continue to present the first display interface comprising the plurality of shortcuts on the display of the terminal and control the communication interface to send first display data to the second terminal to display M shortcuts in a second display interface, wherein the M shortcuts correspond to the portion of the set of applications, wherein M>zero, wherein the first display data indicates the M shortcuts, and wherein the second display interface is presented on the second terminal;
detect that a user triggers a second shortcut in the second display interface, wherein the second shortcut is one of the M shortcuts; and
control the communication interface to send second display data to the second terminal to display a second interface of a second application corresponding to the second shortcut in the second display interface, wherein the second display data indicates the second interface displayed when the second application is running, wherein the first display interface is different from the second display interface when the second display interface comprises the second interface, and wherein the first display interface is presented on the display.

12. The terminal of claim 11, further comprising an input device coupled to the processor and configured to obtain a first gesture from the user on a first shortcut when the first shortcut is displayed in the first display interface, wherein the processor is further configured to control the communication interface to send third display data to the second terminal in response to the first gesture to enable the second terminal to display the third display data in the second display interface, and wherein the third display data is correlated with content corresponding to the first shortcut.

13. The terminal of claim 12, wherein the first shortcut is in a multitask window displayed in the first display interface, wherein the multitask window comprises at least one shortcut of the applications, and wherein the third display data comprises a first interface of an application corresponding to the first shortcut.

14. The terminal of claim 13, wherein the input device is further configured to obtain a tapping gesture on a first shortcut button on the first shortcut in the multitask window.

15. The terminal of claim 14, wherein after obtaining the tapping gesture, the processor is further configured to:

obtain a device running status of the terminal, wherein the device running status comprises at least one of a battery level, network quality, a memory size, and central processing unit (CPU) usage of the terminal;
identify that the device running status of the terminal does not support displaying of the first interface in the first display interface; and
send the third display data to the second terminal.

16. The terminal of claim 11, further comprising an input device coupled to the processor and configured to obtain a third gesture on a third interface of a third application displayed in the first display interface when the third application is running in a foreground of the terminal, wherein the processor is further configured to control the communication interface to send fourth display data to the second terminal in response to the third gesture to enable the second terminal to display the fourth display data in the second display interface, wherein the fourth display data is correlated with the third application, and wherein the display is further configured to cease to display the third interface in the first display interface.

17. The terminal of claim 16, wherein the fourth display data indicates a display interface displayed when the third application is running.

18. The terminal of claim 17, wherein video playback progress displayed in the first display interface is the same as video playback progress displayed in the second display interface when the third application is a video type application, wherein a chat record in a chat window in the first display interface is the same as a chat record in a chat window in the second display interface when the third application is an instant messaging type application, and wherein a game system interface displayed in the first display interface is the same as a game system interface displayed in the second display interface when the third application is a game type application.

19. A computer program product comprising computer-executable instructions stored on a non-transitory computer-readable medium that, when executed by a processor, cause a first terminal to:
present a first display interface comprising a plurality of shortcuts on a display screen of the first terminal, wherein the plurality of shortcuts corresponds to a set of applications installed on the first terminal;
establish a coupling to a second terminal;
receive an indication of a mode of the first terminal, wherein the mode corresponds to a portion of the set of applications installed on the first terminal;
continue to present the first display interface comprising the plurality of shortcuts on the display screen of the first terminal and send first display data to the second terminal to display M shortcuts in a second display interface, wherein the M shortcuts correspond to the portion of the set of applications, wherein M>zero, wherein the first display data indicates the M shortcuts, and wherein the second display interface is presented on the second terminal;
detect that a user triggers a second shortcut in the second display interface, wherein the second shortcut is one of the M shortcuts; and
send second display data to the second terminal to display a second interface of a second application corresponding to the second shortcut in the second display interface, wherein the second display data indicates the second interface displayed when the second application is running, wherein the first display interface is different from the second display interface when the second display interface comprises the second interface, and wherein the first display interface is presented on the first terminal.

20. The computer program product of claim 19, wherein the computer-executable instructions further cause the first terminal to:

identify that a first shortcut is displayed in the first display interface;

obtain a first gesture from the user on the first shortcut; and send third display data to the second terminal in response to the first gesture to enable the second terminal to display the third display data in the second display interface, wherein the third display data is correlated with content corresponding to the first shortcut.

* * * * *